United States Patent
Werker et al.

(10) Patent No.: US 9,487,624 B2
(45) Date of Patent: Nov. 8, 2016

(54) METHOD FOR RECOVERY OF STABILIZED POLYHYDROXYALKANOATES FROM BIOMASS THAT HAS BEEN USED TO TREAT ORGANIC WASTE

(75) Inventors: Alan Gideon Werker, Lomma (SE); Patric Jannasch, Lund (SE); Peter Stig Tomas Johansson, Lund (SE); Per Olof Gosta Magnusson, Lund (SE); Franciscus Hubertus Jacobus Maurer, Hollviken (SE)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 297 days.

(21) Appl. No.: 13/816,985

(22) PCT Filed: Aug. 18, 2010

(86) PCT No.: PCT/IB2010/002067
§ 371 (c)(1),
(2), (4) Date: Mar. 18, 2013

(87) PCT Pub. No.: WO2012/022998
PCT Pub. Date: Feb. 23, 2012

(65) Prior Publication Data
US 2013/0203954 A1 Aug. 8, 2013

(51) Int. Cl.
C08G 63/89 (2006.01)
C08G 63/06 (2006.01)

(52) U.S. Cl.
CPC .............. *C08G 63/89* (2013.01); *C08G 63/06* (2013.01)

(58) Field of Classification Search
None
See application file for complete search history.

(56) References Cited

U.S. PATENT DOCUMENTS

| 7,118,897 B2 | 10/2006 | Narasimhan et al. |
| 2006/0057692 A1 | 3/2006 | Narasimhan et al. |
| 2008/0193897 A1 | 8/2008 | Kubo et al. |
| 2008/0193987 A1 | 8/2008 | Mantelatto et al. |
| 2011/0293938 A1 | 12/2011 | Takita et al. |

FOREIGN PATENT DOCUMENTS

| CN | 101255227 A | 9/2008 |
| JP | 2000189183 A | 7/2000 |
| JP | 2008513018 A | 5/2008 |
| WO | 2010067542 A1 | 6/2010 |
| WO | 2010067543 A1 | 6/2010 |

OTHER PUBLICATIONS

Yu, Jian; Chen, Lilian XL; "Cost-Effective Recovery and Purification of Polyhydroxyalkanoates by Selective Dissolution of Cell Mass" Biotechnology Progress, 22, 547-553, 2006.*
Carrasco, F; et al "Thermal Stability of Polyhydroxyalkanoates" Journal of Applied Polymer Science, 100, 2111-2121, 2005.*
Hablot, Elodie; et al; "Thermal and thermo-mechanical degradation of poly(3-hydroxybutyrate)-based multiphase systems" Polymer Degradation and Stability, 93, 413-421, 2008.*
Lütke-Eversloh, Tina; et al; "Biosynthesis of novel thermoplastic polythioesters by engineered *Escherichia coli*" Nature Materials, 1, 236-240, 2002.*
Chua, A., et al., "Production of polyhydroxyalkanoates (PHA) by activated sludge treating municipal wastewater: effect of pH, sludge rentention time (SRT), and acetate concentration in influent", Water Research, Sep. 1, 2003, pp. 3602-3611, vol. 37, No. 15, Elsevier Science Ltd., Amsterdam, NL, XP004437615.
Kopinke, F., et al., "Thermal decomposition of biodegradable polyesters-I: Poly (β-hydroxybutyric acid)", Poly Degradation and Stability, Apr. 1, 1996, pp. 25-38, vol. 52, Elsevier Science Limited, XP002653175.
CN Search Report issued Jan. 22, 2014 in re CN Application No. 201080069666.2 filed Apr. 17, 2013.
JP Office Action mailed Sep. 1, 2014 in re JP Application No. 2013-524485 filed Feb. 14, 2013.

\* cited by examiner

*Primary Examiner* — Renee Claytor
*Assistant Examiner* — David Berke-Schlessel
(74) *Attorney, Agent, or Firm* — Coats and Bennett PLLC

(57) ABSTRACT

The invention is directed to a method of increasing the chemical and/or thermal stability of PHA in biomass where the biomass is contained within mixed liquor, and wherein the mixed liquor is treated by a combination of removing water from the mixed liquor and pH adjustment of the mixed liquor or maintenance of the pH of the mixed liquor within a selected pH range, and wherein the method includes reducing the pH of the mixed liquor below 6, or maintaining the pH of the mixed liquor below 6 for a selected period of time, and wherein the pH adjustment of the mixed liquor to below 6 or the maintenance of the pH of the mixed liquor below 6 gives rise to an increase in chemical and/or thermal stability of the PHA in the biomass.

14 Claims, 32 Drawing Sheets

METHOD FOR RECOVERY OF STABILIZED POLYHYDROXYALKANOATES FROM BIOMASS THAT HAS BEEN USED TO TREAT ORGANIC WASTE

This application is a U.S. National Stage Application of PCT Application No. PCT/IB2010/002067, with an international filing date of Aug. 18, 2010. The subject matter of this application is incorporated herein.

TECHNICAL FIELD

The present invention relates to a process for producing and recovering polyhydroxyalkanoates (PHA) from biomass, and more particularly relates to a process for chemically and thermally stabilizing PHA in the recovery process.

BACKGROUND OF THE INVENTION

Biomass produced as part of services in treating industrial and/or municipal wastewater can be purposefully enriched with PHA accumulating bacteria (PAB). The PAB-rich biomass exhibits a significant potential to accumulate PHA when fed with waste organic streams containing readily biodegradable chemical oxygen demand (RBCOD). RBCOD is typically comprised of but is not limited to volatile fatty acids (VFAs). When PAB are fed with RBCOD, PHA may be made to accumulate in the biomass to significant levels of the final biomass dry weight. The PAB-rich biomass is mixed with an RBCOD-rich wastewater under aerobic or anoxic conditions so as to maximize the PHA yield. Typically, the final biomass dry weight is well in excess of 40% as PHA where one kilogram of active biomass dry weight can typically be made to accumulate in excess of two thirds of a kilogram PHA dry weight. This PHA content is distributed in the PAB in the biomass as small intracellular granules imbedded in the cytoplasm and these granules can range up to about 0.5 µm in diameter. The inclusions are surrounded by their own phospholipid membrane which contains proteins for the inclusion synthesis. PHA can be recovered from the biomass as a polymer with purity in excess of 95% and even up to 99%. The recovered polymer will be referred to as recovered PHA-resin. The objective in the development of this disclosed invention has been to:
1. establish a viable process for recovery of PHA resin from biomass,
2. maximize yield of PHA mass recovered from the biomass in the process,
3. minimize the potential for uncontrolled decrease in PHA molecular weight during solvent extraction, and
4. facilitate a means to extract a PHA resin exhibiting high thermal stability.

The PHA produced by this biomass is typically, but not exclusively, poly(3-hydroxybutyric acid) and/or a co-polymer of 3-hydroxybutyric and 3-hydroxyvaleric acids. The PHA that can be recovered from this biomass is a biodegradable polyester or biopolymer exhibiting physical properties similar to plastics like polypropylene (PP) and polyethylene (PE). PHAs can be compounded into plastics or further converted into central platform chemicals. However, unlike PP and PE, PHA is completely biodegradable. The invention represents a sub-component of the overall biorefinery concept for a wastewater treatment process which can comprise but is not limited to the following elements (FIG. 1):

I. A unit process designed to convert some or all of the organic material in the influent to an RBCOD rich wastewater and to remove all the RBCOD from the wastewater while producing a biomass with an extant potential for significant accumulation of PHAs.
II. A means for controlled retention and metered export of the produced biomass for purposes of stable wastewater treatment process operation and PHA production.
III. A unit process for accumulating PHA to significant levels in the produced biomass by using a RBCOD rich feed derived from the same wastewater or other on- or off-site waste organic sources.
IV. A unit process to make the PHA-in-biomass thermally stable and resistant to decomposition due to elevated temperatures or chemical interactions while ensuring parallel benefit in, for example, energy production from any non-PHA material removed from this biomass.
V. A unit process to extract a PHA resin with thermal stability.

The present invention is focused on step IV, namely, preparing the PHA in the biomass for recovery and as a necessary step towards eventual purification (V) from this PAB-rich biomass after accumulation. The invention provides practical solutions for meeting product quality objectives in PHA recovery and satisfying parallel wastewater treatment and waste residual handling performance and savings objectives as explained further below.

Recovery of PHA from the PHA-rich biomass is the problem of separation of the granules from the other non-PHA cellular material (NPCM) that contains both organic and inorganic fractions. The quality for PHA resin recovered from biomass for use as an ingredient to the formulation of plastics may be assessed in terms of its: (1) purity, (2) average molecular weight and its distribution, (3) thermal stability, (4) chemical stability, and (5) co-polymer microstructure and composition. Purity refers to the remaining biomass NPCM and perhaps also other chemicals or elements introduced or carried over during the purification process.

Average molecular weight reflects the average size of the polymer chain lengths. In most cases PHA is a polymer with a relatively broad molecular weight distribution. $M_n$ is the number average molar mass and it is defined as:

$$M_n = \frac{\sum N_i M_i}{\sum N_i}$$

where $N_i$ is the number of molecules with molar mass $M_i$. The weight average molar mass, $M_w$, is defined as:

$$M_w = \frac{\sum N_i M_i^2}{\sum N_i M_i}$$

The polydispersity index (PDI), a measure of the molecular weight distribution, is defined as:

$$PDI = \frac{M_w}{M_n}$$

$M_w$ is always larger than $M_n$ so the PDI will always be greater than 1. PDI for PHA-resin is typically around 2 and $M_w$ can range from 10,000 to 3,000,000 Da. Molecular weight distribution can be influenced by the method of accumulating PHA in the biomass, the method for recovering the PHA resin and the method of further processing the resin into end-user products.

Thermal stability refers to the resistance of the polymer to decomposition as a function of temperature and time in a specified atmosphere. The atmosphere can be inert (such as nitrogen) or reactive (such as air or oxygen). Thermal stability can be assessed in terms of a characteristic decomposition temperature of sample volatilization or weight loss. Practically, the stability of the polymer at or slightly above its processing temperature is also relevant. Thus, thermal stability is also assessed by the kinetics of degradation in processing, which is to say molecular weight decrease and/or dynamic viscosity decrease, in air or an inert atmosphere such as nitrogen gas, and at relevant processing temperatures. Chemical stability here refers to the tendency for polymer degradation, in contact with liquids (solvents, non-solvents, aqueous, non-aqueous or mixtures thereof). Chemical reactions may initialize due to temperature with transport and diffusion of compounds or reactive groups which will be more mobile with the polymer in contact with liquid. Chemical reaction products in the liquid environment may further promote the degradation process.

Mixed cultures can be made to produce homopolymers and co-polymers of PHA and the type and distribution of the monomers in the co-polymer influence processing characteristics and the final material properties. For example, feeding the biomass with butyric or acetic acid represents RBCOD for the accumulation of poly(3-hydroxybutric acid) (PHB). Feeding biomass an RBCOD mixture of acetic and propionic acids can promote production of copolymers of 3-hydroxybutric acid and 3-hydroxyvaleric acids (PHBV).

Impurities in the PHA resin may be organic and/or inorganic. While a high purity is desirable, some impurities may be acceptable due to the fact that different impurities exhibit differing effects on the polymer properties or processability. Generally we have been striving for PHA recovery to absolute purity in excess of 95% and ideally in excess of 99%. The impurities are typically related to organic and inorganic components found in biomass NPCM. The organic impurities can include protein, carbohydrate, and lipid residuals from the biomass. The inorganic impurities can include cations such as calcium, magnesium, sodium and corresponding anions such as phosphate, sulphate, and chloride. The PHA impurity may also be due to moisture retention which is a reflection of the presence of undesirable organic or inorganic impurities. Organic impurities can produce undesirable off-colouring and pungent odours in PHA resin processing into plastics and products. Organic impurities are also implicated in the polymer chemical stability. Inorganic impurities can severely reduce the resin thermal stability. PHA in dried PHA-rich biomass after an accumulation process may typically range from 40 to 60% of the dry mass.

The chemical and thermal stabilities of PHA in pure and mixed culture biomass after accumulation are typically poor and temperatures in excess of 100° C. cannot be used in the biomass processing or PHA recovery if excessive molecular weight loss is to be avoided.

Given that up to 60 percent of dried PHA-rich biomass may be NPCM, one may concurrently need to resolve the fate of this non-PHA fraction along with efficient PHA recovery. Eventual disposal of excess biomass created from biological treatment of wastewater has become a global problem. Significant efforts in research and development have been devoted to technology development that maximizes the recovery of energy and resources from wasted biomass and minimizes the material requiring secure disposal.

NPCM fate is a constraint for PHA recovery within the context of excess biomass used to treat wastewater. NPCM residuals may be compatible with and ideally further improve the state-of-the-art in environmental protection when it comes to solids handling at wastewater treatment facilities. Much technology and development expense is being devoted to correct for deficiency and problems created by current process solutions for sludge handling at wastewater treatment plants. Ideally the approach for PHA recovery should not only generate potential in value added biopolymer production but also opportunity in greater and more effective control in overall residual solids management.

In the conversion of biopolymer PHA from a purified resin into plastic, additives may be combined. These components are combined at or slightly above the processing temperature of the resin and the mixture is extruded and formed into plastic pellets. In a melting cycle the final amount of PHA in the material may be reduced due to mixing additives with the melt. Usually it is intended to compound the PHA into plastic pellets and these pellets then become a raw feed used in the production of end-user products that again requires heating and forming the plastic. Thus, the PHA resin generally survives at least two heating cycles before becoming an end-user product. For every heating cycle the PHA in the plastic will reduce in average molecular weight. The plastic material properties are influenced directly and indirectly by the resin molecular weight. For example, viscosity of the melt decreases with molecular weight and the processability of the plastic is sensitive to the melt viscosity. Too high or too low a viscosity can be equally undesirable. Notwithstanding, predictable behaviour of the polymer in the melt is preferred and so a polymer of consistent thermal and chemical stabilities is of general benefit. The mechanical properties depend on the final molecular weight of the processed polymer and molecular weight decrease can mean a negative influence on the product mechanical properties.

The level of average molecular weight decrease depends on factors including the PHA thermal and chemical stabilities, time in the melt, temperatures, screw speeds, and shear forces applied for processing. Degradation of the polymer in the melt is also strongly influenced by chemical impurities or additives that can add to or detract from the polymer stability for a given processing temperature. The non-PHA fraction in the end material may comprise of the original impurities present in the extracted resin. The non-PHA fraction will also consist of the added organic and inorganic compounds.

The objectives of the added compounds can be summarized as follows:

1. Thermal stabilizing agents help to reduce unwanted polymer degradation in the melt that impair the processability of the end product material properties. They can include both inorganic and organic additives and introduce costs to the plastic production from PHA. Examples are zinc oxides, zinc stearate, magnesium stearate, calcium stearate, barium stearate and phosphonic acids.
2. Nucleating agents increase the onset and rate of crystallization of the polymer from the melt and fast crystallization is of practical importance for industrial plastic processing and service life of the final product. The final PHA morphology is influenced which in turn affects the material properties. Examples are boron nitride, talc, palmitic acid, oleic acid, linoleic acid, saccharin, ammonium chloride, stearic acid salts and phosphonic acids.
3. Plasticizing compounds lower the glass transition of the polymer making it softer, decreasing brittleness and thereby increasing elongation and impact strength. These additives play a role for short chain length PHAs like PHB and PHBV that are brittle. Examples are acetyl trialkyl citrates, triacetin, phthalate esters, maleate, sebacate, adipate, PHA oligomers, diols and triols.
4. Colouring agents impart specific colouring to the plastic. Colour requirements are very demanding and so it is desirable that any colouration tendency from the resin due to processing is consistent and can be compensated for.
5. Composites involve an additive that serves a functional role of filler and augments the material mechanical properties. For example, the biomass NPCM can be considered to be a filler and the resultant composite has been used as a biodegradable container for tree seedlings where mechanical property demands are not onerous. Natural fibres can also be used as a composite with PHA where the polymer provides the matrix for the fibre network. Such fibre reinforced PHA can exhibit the strength of PHA with impact resistance far in excess of PHA alone. Fillers may also be used to reduce the cost of the plastic by reducing the PHA content so long as the composite material properties meet the application demands.

The recovered PHA from biomass has been observed to exhibit poor thermal and chemical stability. The native resin available on the market today degrades rapidly in the melt. Molecular weight loss in processing can only be permitted up to the point where melt viscosity becomes too low or final product quality is adversely impacted. However, such molecular weight loss margins may not be practically feasible to obtain within processing times. Thermal stability of recovered PHA resin can be improved by further purification to remove the implicated impurities or by adding stabilization agents. This will add complexities and expenses. In addition, some stabilization agents may create a liability due to potential for environmental problems in the life cycle of PHA-based plastic products.

NPCM from biomass can be removed to upgrade the PHA content of the biomass recovered from an accumulation process. NPCM can be removed using treatment strategies involving mechanical, chemical, enzyme, and thermal means or combinations thereof. Optimal NPCM removal conditions involve treatment duration, chemical/enzyme concentration, energy input, and temperature. Notwithstanding the potential to improve the PHA content of the biomass to well above 70%, such treatment may promote some degradation of the PHA in the biomass. Lysis of cells and release of PHA granules into the matrix can further complicate the separation of the PHA inclusions from other cellular debris and reduce product yield. Significant solubilisation of the biomass creates a downstream wastewater treatment problem due to organic carbon, nitrogen and phosphorus release into solution.

Even if the PHA content can be upgraded, conditioning of the biomass creates a parallel waste management liability due to concomitant release of carbon, nitrogen and phosphorus. This liability can be converted into an asset in situations where the carbon can be used to produce biogas and the nutrients can be recycled for biological treatment of nutrient deficient industrial wastewaters. However, yield in polymer recovery may be reduced due to impaired capture of suspended solids following cell disruption leading to mixtures of cellular debris and PHA granules.

Even if PHA content can be upgraded by biomass conditioning, production of a PHA resin may ultimately always require some form of solvent extraction. The PHA is separated from NPCM by dissolving the PHA in a solvent. If temperatures above 100° C. are to be avoided due to poor thermal stability of the PHA in the biomass then chlorinated solvents such as chloroform and dichloromethane may be necessary. When these solvents are used to extract the PHA, a non-solvent such as water or methanol is used to precipitate the PHA from the solvent after filtering the non-dissolved NPCM. Large volumes of hazardous waste are generated due to the combination of a chlorinated solvent and the co-solvent used.

When it comes to PHA, if the biomass has been conditioned to at least the extent of improved thermal and chemical stabilities of the PHA in the matrix, then requisite temperatures in the process of PHA recovery can range between 100 and 160° C. with little molecular weight loss. In this temperature range a number of poor solvents can extract the PHA from the NPCM. These are solvents that do not dissolve PHA under 100° C. but are good solvents to extract PHA above 100° C. Examples of such solvents are acetone, butanol, propanol, ethanol, methanol, and 1,2 propylene carbonate, among others. However, the stability of PHA dissolved in these solvents is also solvent type and isomer dependent. Some PHAs can be extracted at lower temperatures so that requisite solvent and extraction temperature is also PHA dependent. PHB presents one worst case scenario for solubility and solvent extraction. Notwithstanding potential for exposure to elevated temperatures required for PHA-resin solvent extraction from biomass, biomass drying in general before solvent extraction may be more effectively accomplished at temperatures well above 100° C. For example, dual belt low temperature dryer may mean exposure of the biomass to temperatures between 140 and 180° C.

The NPCM residual after extraction still contains most of the organic carbon, nitrogen and phosphorous of the original biomass. This extraction residual is hygienic and a suitable feedstock for biological and thermo-chemical technologies yielding platform chemicals and/or energy. The NPCM or subsequent residuals after chemical/energy extraction can also be used directly in product formulations intended to supply nutrients and minerals for agriculture. Therefore the method of PHA recovery may also be seen as a parallel method for capture of other value added residuals while avoiding waste management problems as compared to current state-of-the-art in sludge management.

Development efforts for a PHA recovery solution from PHA-rich biomass have been with the following central objectives in mind:
1. Limit the need for chemical additions so as to reduce process complexity and costs associated with waste biomass processing,
2. Enable higher temperature biomass drying before resin extraction,
3. Enable higher temperature resin solvent extraction from the biomass with non-chlorinated solvents by ensuring the PHA in the biomass is thermally and chemically stable before solvent extraction,
4. Facilitate the production of a PHA of high thermal stability in order to significantly reduce the need for stabilizing agents in plastic formulation, and
5. Capture a source of NPCM residual that can be readily managed and exploited for its mineral, organic, and calorific contents.

SUMMARY OF THE INVENTION

The present invention entails a method of increasing the stability of PHA in a biomass where the biomass is contained within mixed liquor. The method includes solubilizing ions associated with the biomass in the mixed liquor by treating the mixed liquor by reducing the pH of the mixed liquor to below 6, or maintaining the pH of the mixed liquor below 6 for a selected period of time. Thereafter, dewatering the mixed liquor and effectively separating at least some of the ions from the PHA in biomass which results in the increased stability of the PHA in the biomass.

The present invention also entails a method of increasing the chemical and/or thermal stability of PHA in the biomass contained within the mixed liquor wherein the mixed liquor is treated by a combination of removing water from the mixed liquor and PHA adjustment of the mixed liquor or maintenance of the pH of the mixed liquor within a selected pH range. More particularly, the method includes reducing the pH of the mixed liquor below 6 or maintaining the pH of the mixed liquor below 6 for a selected period of time. The pH adjustment of the mixed liquor to below 6 or the maintenance of the pH of the mixed liquor below 6 gives rise to an increase in chemical and/or thermal stability of the PHA in the biomass.

DESCRIPTION OF PREFERRED EMBODIMENTS

PHA in pure and mixed culture biomass may exhibit poor thermal stability. Commercially available PHA resin is also known to exhibit poor thermal stability in absence of any stabilizing agents. The thermal stability of PHA-in-biomass, as well as PHA in the form of a pure resin is understood to be influenced significantly by the presence of residual group I and II metals such as calcium, magnesium, and sodium.

Thermal instability of PHA in the resin can be overcome to some degree by adding stabilizing agents typically while PHA is in a melt state. Thus, stabilizing agents are added at the expense of average molecular weight decrease. Furthermore, stabilizing agents may not interact homogenously with the PHA-resin matrix which in turn affects the material properties. Thus, the higher the background thermal stability of the PHA-resin is, the better the overall properties of the blended matrix will be.

Alternatively, it has been reported that thermal stability of PHA resin can be improved upon by reducing the residual metal content in further expense and effort through acid washing in an acidified chlorinated solvent. Poor thermal stability of PHA as a purified resin may compromise the polymer processability. Whether or not the PHA resin thermal stability is compensated for (stabilizing agents) or improved (acid-chlorinated solvent treatment), these remedies introduce added expense and waste detracting from the attractiveness of PHA as a green engineering raw material. Furthermore the potential for restriction on the type of suitable extraction solvent for the resin purification means a PHA-rich biomass is desired where temperatures in excess of 100° C. can be applied in drying and solvent extraction without significant molecular weight loss in the final resin, and therefore the thermal and chemical stabilities of the PHA in the biomass needs to be improved before biomass drying and solvent extraction of the resin.

Figure 1:
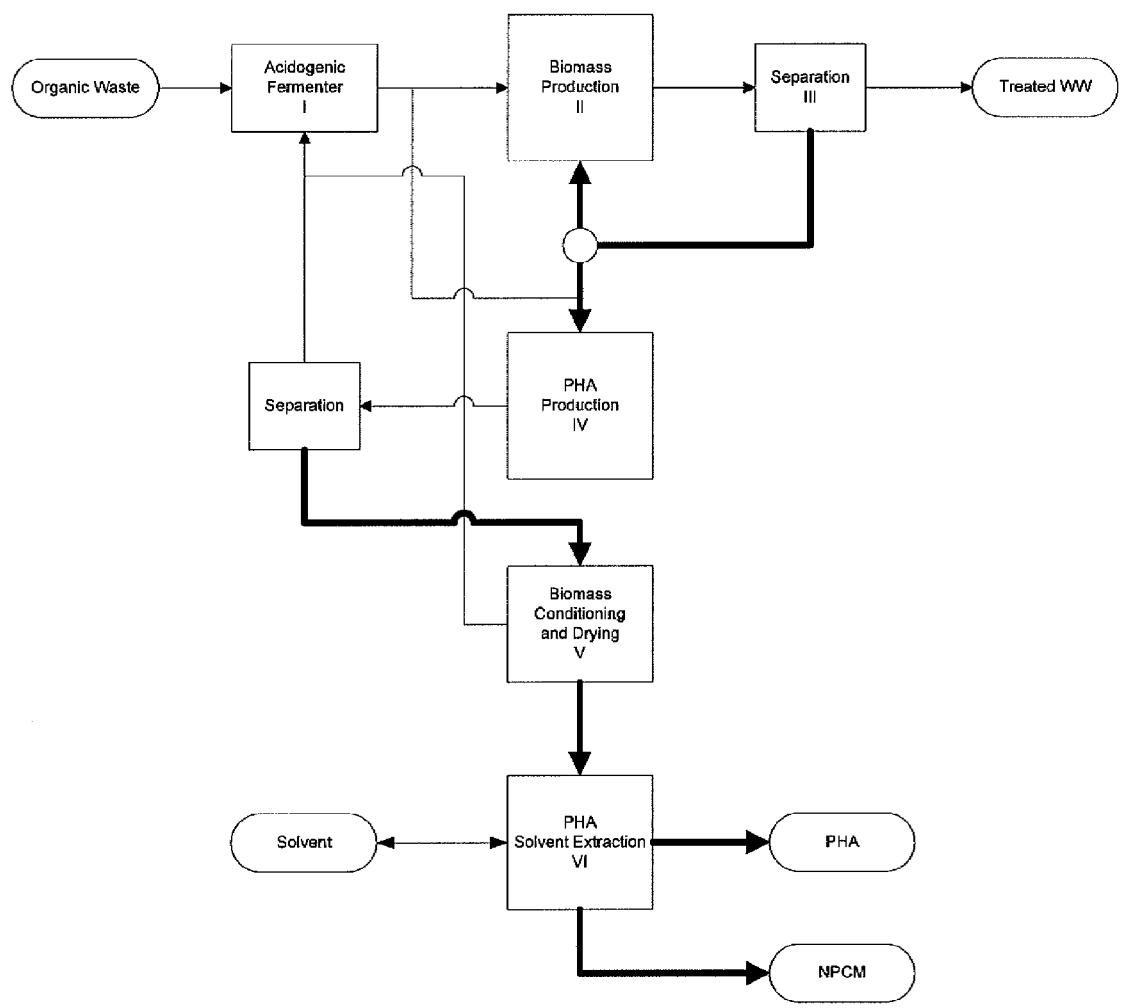
FIG. 1. Process flow diagram for the production of PHA.
Figure 2:
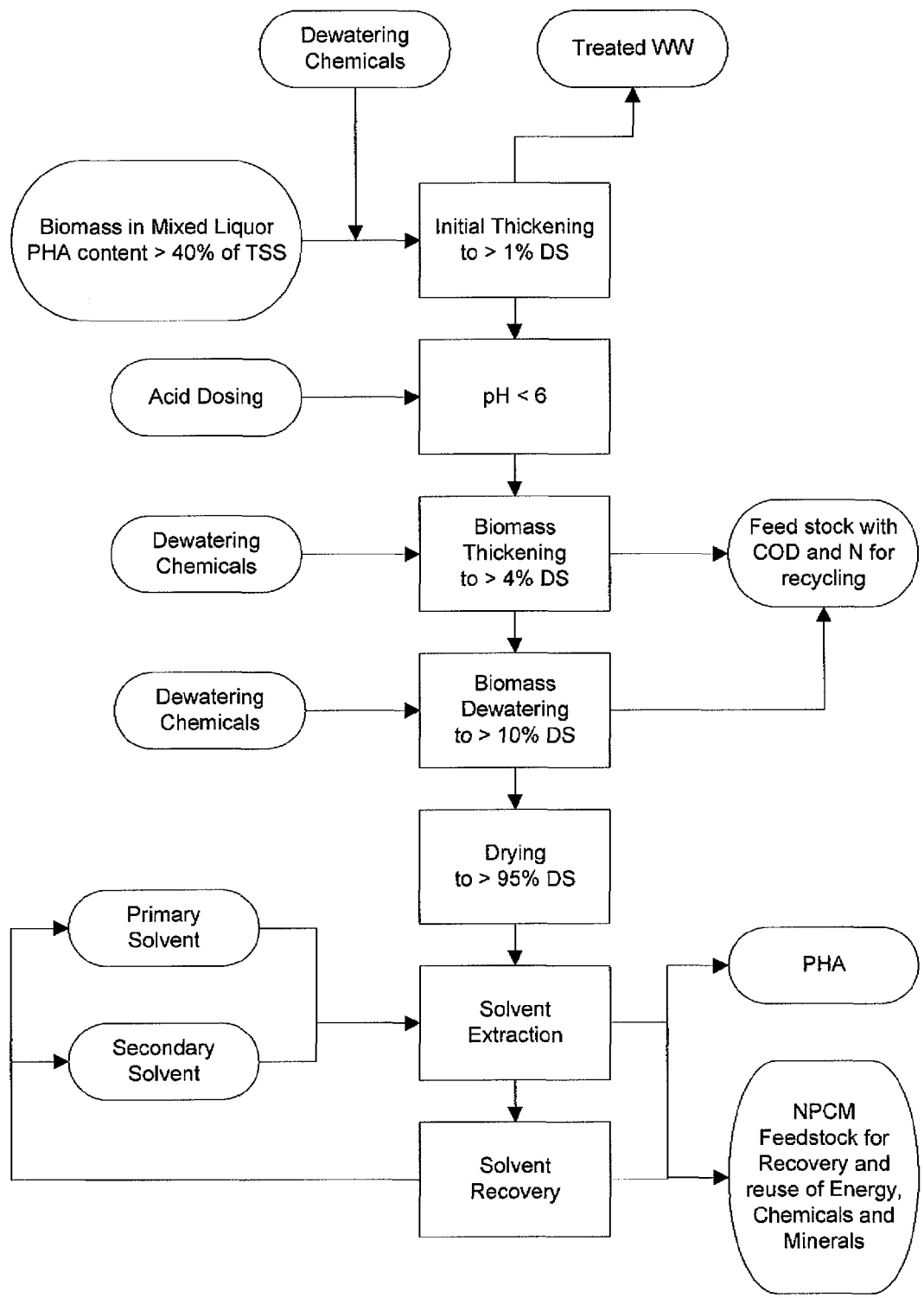
FIG. 2. Process flow diagram for recovery of PHA from biomass.

A solution for processing mixed-culture biomass after accumulation of PHA involves a sequence of processing steps (FIG. 2). It may well be that some of the processing steps are carried out as part of distinct and separate activities separated substantially in time and/or in place. While distinct unit processes (reactors) may be required for undertaking some of these process steps, other steps in the sequence may be readily integrated and combined within the same unit process or reactor. The input to the process is a biomass fresh after accumulation and containing in excess of 40% dry weight of PHA. The PHA in this biomass matrix exhibits poor chemical and thermal stability. The biomass is also still active with enzyme systems prone to depolymerise the stored PHA. The output of process V in FIG. 1 is the same biomass containing less than 5% weight in moisture and PHA with significantly improved chemical and thermal stability. This biomass can be extracted by a solvent at temperatures above 100° C. without impairing the properties of the PHA. The products after solvent extraction are a PHA resin, NPCM and a solvent that can be recycled.

The sequence of steps is as follows:
1. Primary Biomass Dewatering after Accumulation:
   Discharge as much treated wastewater as possible. After accumulation, mixed liquor with 2 to 10 g/L TSS where the PHA of that TSS is in excess of 40% on a dry weight basis may be typically expected. The pH of the mixed liquor is typically greater than 7 but less than 10. The accumulation process provides biological treatment in carbon removal. Subsequent biomass handling requires pH adjustment and so it is advantageous to remove as much liquid as possible to reduce the buffering capacity. Anaerobic conditions are beneficial in order to minimize PHA loss due to aerobic biomass metabolism. Settled biomass has been stored up to 12 hours without any significant impact on polymer content. It is anticipated that this initial dewatering will achieve a dry solids greater than 1% but less than 10%. Chemical additions may be used to assist in the biomass flocculation. Entrainment of air into the dewatering should be avoided but if unavoidable the amount and duration of air entrainment should be minimized.
2. Reduction of pH in the Mixed Liquor:
   The mixed liquor pH is adjusted to between 2 and 5 in order to inhibit microbial activity while also improving thermal and chemical stability of the PHA in the biomass. Improvement in thermal stability of PHA-in-biomass can be assessed by Thermal Gravimetric Analysis (TGA) following a standardized method. Improved thermal stability is preferred for the biomass drying and subsequent solvent extraction both with temperatures in excess of 100° C. Thermal stability is positively correlated with the inorganic content of the biomass, and most notably with cations such as calcium.

Improvement of PHA chemical stability can be assessed, for example, by loss in molecular weight after a standardized extraction in acetone at 125° C. for two hours. It is possible for the PHA in the biomass to be thermally stable without being chemically stable and it is possible to achieve chemical stability with only minor improvement of thermal stability. While thermal or chemical stabilization alone reduces the extent of molecular weight loss upon high temperature drying and solvent extraction, a combination of thermal and chemical stability provides the best outcome.

Reduction of the pH results in a side-effect of marginal biomass solubilisation. For example, acidification with $H_2SO_4$ to pH 2 may be expected to release in the order of 100 mg COD/gTSS and 5 mg N/gTSS. Solubilisation of COD and nitrogen from the biomass is related to release of (most likely) extracellular protein and polysaccharides. In general nitrogen release from the biomass is proportional to carbon release. Below pH of 5 the liquid matrix buffer capacity will become negligible. However, the biomass has been observed to exert a significant and constant buffer capacity for pH less than 5 and greater than 2. In the neighbourhood of pH 2 the biomass buffer capacity increases dramatically. We have observed that the objectives of thermal and chemical stabilization of the PHA in the biomass can be adequately achieved with pH greater than 2 but less than 5. The requisite pH may vary from case to case depending on the nature of the mixed liquor matrix and the accumulation feed. Since pH adjustment imparts an operational cost, pH adjustment should be no more than is necessary. TGA measurements provide a means to determine if the optimal PHA-in-biomass stabilization has been achieved.

Reducing the pH of the mixed liquor may include the release of carbon dioxide gas as inorganic carbon forced to carbonic acid. Such carbon dioxide bubbles can be utilized for dissolved gas flotation and separation of the biomass from the mixed liquor after pH adjustment. If oxidation or mechanical dispersion of the biomass is used with the acidic pH adjustment then the dewatering properties of the suspended solids have been found to be degraded.

Similar results of increased chemical with some improved thermal stability of PHA in the biomass can be achieved by mild oxidation. Examples of non-specific oxidants include hypochlorite, hydrogen peroxide and ozone. Mild oxidation of the biomass with hypochlorite alone may not improve thermal stability to the same extent but nevertheless seems to create a satisfactory improvement in PHA stability for hot solvent extraction. TGA measurements indicate that hypochlorite treatment will increase the temperature demarking the onset of thermal degradation for PHA in the biomass. Mild oxidation of the biomass improves the PHA chemical stability. Such mild oxidation can be combined with pH adjustment with good results in thermal and chemical stability for solvent extraction of the PHA from the biomass. However, oxidation of the biomass also solubilises significant organic carbon and nitrogen into solution. The advantage of stripping COD from the biomass is an upgrade of the PHA content in the suspended solids. The disadvantage of release of COD and nitrogen is that this generates a wastewater treatment concern. Oxidants may also degrade polymer as well as the biomass.

3. Secondary Biomass Thickening and Dewatering after pH Reduction:

The biomass is further dewatered by various means including dissolved gas flotation for example. The gas may be in part due to carbon dioxide bubbles formed by acidification. Dispersion air may also be added to achieve biomass separation by flotation. Further, chemicals may be added during separation in order to improve the biomass dewaterability. After pH lowering of the mixed liquor, the biomass metabolic activity is reduced and the PHA in the biomass is thereby less prone to metabolic degradation during dissolved air flotation or other forms of air entrainment. The biomass is preferably dewatered to in excess of 20% dry solids content. Dissolved air flotation may achieve in excess of 4% dry solids so additional means such as centrifugation will be required. Other methods of reducing the water content of the biomass can be applied in place of dissolved air flotation and/or centrifugation.

COD solubilization can also be augmented by oxidants, enzymes, surfactants, dispersion, homogenization and/or thermal treatment of the biomass. Chemical, thermal or mechanical treatment of the biomass at this stage may be of interest for reasons including but not limited to: (1) upgrading PHA content in the biomass, (2) supply of COD for VFA or biogas production, (3), supply of nitrogen for biological wastewater treatment, or (4) improvement in dewatering of the suspended solids. At the same time there is risk that these treatments may be too aggressive and cause PHA loss. Input of resources (chemicals and energy) may be justified from perspectives of both the PHA and NCPM management. Optimization of conditions, including dose, time and temperature, are likely to be required on a case by case basis for mixed culture systems.

4. Biomass Drying or Water Displacement:

To achieve optimal conditions for high temperature solvent extraction the biomass should be dried or the water should be displaced. Final moisture content after drying should preferably not be in excess of 5%. Above conditioning to achieve stability of the PHA-in-biomass enables the use of drying temperatures well in excess of 100° C.

5. Solvent Extraction:

The PHA may be extracted from the NPCM with a non-chlorinated organic solvent at temperatures above 100° C. and, for PHB, preferably above 120° C. After extraction the PHA is separated from the NPCM before or after PHA precipitation. Depending on the extraction solvent, PHA-resin precipitation may require addition of a second solvent. Solvent is separated from the NPCM and PHA. The solvent can be recovered and reused by distillation. PHA is dried. NPCM and the solvent with associated residues may be recovered and/or in part be used as a fuel for heating requirements.

If sufficient conditioning (stabilization) of the PHA in the biomass was achieved then the PHA-resin after extraction should have retained much of its molecular weight (with reference to the case of no biomass conditioning) and the PHA should be stable as assessed by TGA or by molecular weight loss rate by dynamic rheology measurements.

Assessment of PHA-in-Biomass and PHA-Resin Stability

Thermal Gravimetric Analysis (TGA)

A dried PHA-rich-biomass or PHA-resin sample between 2 and 5 mg is weighed and heated in air or in an inert gas environment such as nitrogen gas. The sample temperature is raised to 105° C. and the weight is allowed to equilibrate. Moisture loss from the sample is assessed after weight equilibration at 105° C. Temperature is raised and weight loss is recorded either under conditions of constant temperature increase (ramp) or time at constant temperature (isothermal). For process assessments, and for results presented in this disclosure, a standardized TGA measurement protocol has been adopted. This TGA protocol includes subjecting a sample biomass to a continuous and constant ramp of 10° C./min (after moisture removal at 105° C.) with a nitrogen atmosphere up to 350° C. and air atmosphere thereafter at 10° C./min up to a final temperature of 600° C. Both polymer in biomass and extracted PHA resin can be assessed by this standardized method. The weight loss and the rate change of weight loss as a function of temperature were considered.

A peak in the trend of sample weight loss rate as a function of temperature for PHA-in-biomass and PHA-resin is typically observed in the range from 200 to 300° C. The area of this peak that is associated with the PHA mass decomposition is abstracted, normalized, and different characteristic temperature-related-attributes of this peak are defined. Decomposition temperature ($T_d$) is defined as the temperature at the point of the maximum PHA weight loss rate employing the standardized TGA protocol defined above. Temperatures representing characteristic fractions of the total peak area can also be defined, such as the 5 ($T_5$), 25 ($T_{25}$), 50 ($T_{50}$), 75 ($T_{75}$) and 95 ($T_{95}$) percentiles. One can also compare the peak area fraction with respect to a specific temperature, such as the PHA decomposition fraction at 250° C. ($f_d^{250}$). The terms $T_5$, $T_{25}$, etc. are defined as being based on the standardized TGA measurement protocol defined above. Thus, to determine $T_5$, for example, a sample biomass is subjected to the standardized TGA measurement protocol. The same would apply for determining $T_d$.

Dynamic Viscosity Measurement by Rheology

Similarly to the presented TGA data, a standardized method of dynamic viscosity measurement has been applied for data reported in this disclosure. A dried extracted PHA sample of 0.6 g was pressed to a maximum pressure of 10 bar at 180° C. over two minutes. The sample was melt-pressed into a disc mould that is 1 mm thick with a diameter of 25 mm. After pressing, the sample was taken out of the disc mould and excess flash material was removed. The resultant PHA disc sample was mounted into a rheometer such as a TA Instrument AR 2000 and the dynamic viscosity was measured with a time sweep measurement of up to 40 minutes at 180° C. During this time sweep, strain amplitude at 2% and frequency at 10 Hz were both held constant. The temperature was maintained constant with nitrogen gas cooling.

The dynamic viscosity (|η*|) expressed in Pa·s can be related linearly to the weight average molecular mass ($M_w$) so long as the melt is non-Newtonian:

$$M_w = m \cdot |\eta^*| + b$$

where m and b are constants of proportionality which may depend on the type of PHA and the conditions of the rheology measurement (temperature, frequency and strain). A decrease in |η*| is tantamount to a decrease in $M_w$. For a given polymer where the constants m and b are anticipated to be the same, differences in |η*| indicate proportional differences in the polymer $M_w$.

Assessment of Average Molecular Weight Distribution

PHA was extracted from dried biomass with an organic solvent at a constant selected temperature and for a predetermined extraction time. The extracted polymer was precipitated and separated from the solvent by a standardized method. The influence of biomass pre-treatment and the extraction method on molecular weight decrease can be determined from a number of relative points of reference such as: (1) first order decay coefficient with reference to the same extraction method for different exposure times, (2) change with reference to a standardized extraction method, or (3) thermal sensitivity with reference molecular weight loss with a change in extraction temperature.

Molecular weight distribution (referenced to polystyrene standards) of the extracted polymer was determined by size exclusion chromatography (SEC). The SEC was performed with a pump (Viscotek VE 1122), a dual refractometer/viscometer-detector (Viscotek Model 250) and three linear columns coupled in a series (Shodex KF-805, Shodex KF-804 and Shodex KF802.5). The detector temperature was 37° C., while the studies were carried out at room temperature. The solvent used was chloroform (Merck pro analysis >99%) having a flow rate of 1 mL/min. The injection volume was 100 μl.

Molecular weight was calibrated with reference to four different polystyrene standards with known average molecular weights of 1,800, 650, 96 and 30.3 kg/mol, respectively. The detector measuring the refractive index was used to examine the signal of the standard and the sample.

The sample examined by SEC was dissolved in chloroform to a concentration of 5 mg/mL at 100° C. for 10 minutes. Before injecting the sample into the column the polymer solution was filtered (PALL Life Sciences Acrodisc® CR 25 mm Syringe Filter with 0.45 μm in pore size). From the resolved distribution of molecular weight for the PHA from each sample, the characteristic quantities of $M_w$, $M_n$ and PDI are calculated.

Experimental Support and Proof of Concept

Biomass Sources and PHA Accumulations in Biomass

Three disparate sources of PHA accumulating biomass were considered. PHA was accumulated by feeding the biomass with selected sources of RBCOD under conditions of nutrient limitation. Nutrient refers to any element for non-PHA biomass growth and excludes organic carbon. For example, nutrient limitations in terms of nitrogen and/or phosphorus requirements for microbial growth have been used to stimulate a PHA storage response in the biomass. The biomass sources were as follows:

Activated sludge (AS) used for treating dairy industry wastewater at a pilot plant scale facility in Sweden (AS-S). AS-S samples have been received and PHA accumulation experiments have been routinely performed on this biomass over two years of pilot plant operation, and 5 years of bench scale process development. The pilot plant consisted of a sequencing batch reactor (SBR). The SBR was with a working volume of 400 L operated with 12 hour cycles. Biomass retention in the SBR was by gravity settling. The nominal wastewater hydraulic retention time (HRT) was 1 day and the process was driven with various sludge ages (solids retention time or SRT) between 1 and 8 days. Organic loading rates from 1 to 2 g-RBCOD/L/d were applied and nutrients were supplied as necessary so as not to be limiting for microbial growth in the wastewater treatment process. This activated sludge biomass has exhibited a significant PHA accumulation potential of up to approximately 100% of the dry biomass weight without PHA.

Activated sludge (AS) used for treating a municipal wastewater at full scale in France (AS-F). An AS-F sample was received and PHA accumulation experiments were performed on this biomass at laboratory (500 mL) and pilot (100 L) scales.

The municipal wastewater treatment plant producing this biomass is full scale and designed for 200,000 person equivalents. The plant manages treatment of urban organic wastewater pollution of 26,750 kgCOD/d. A highly loaded activated sludge unit process removes readily biodegradable organic content from the influent wastewater and this produces approximately 22.2 tonnes of waste activated sludge (WAS) per day. This activated sludge biomass exhibits a PHA accumulation potential up to approximately 67% of the biomass dry weight without PHA.

A pure culture (PC) biomass of *Cupriavidus necator* was cultivated and produced in France (PC-F) and provided as a PC biomass sample dried after PHA accumulation. *Cupriavidus necator* is a gram negative procaryote that has been used for many years in pure culture research for PHA production. This pure culture exhibits an excessive PHA accumulation potential up to approximately 400% of the dry biomass weight without PHA.

PHA was accumulated in the biomass aerobically. The AS biomass from Sweden and France (AS-S and AS-F) was accumulated with PHA in a 100 L fed-batch reactor using either fermented dairy wastewater or an industrial wastewater as substrates. Both substrates are rich in VFAs. At the same time both sources are deficient in nutrient content meaning that microbial growth was limited by nutrients when the biomass was fed with these wastewaters. Thus the wastewater VFAs were used as RBCOD for the PHA accumulation in the biomass and a microbial growth response during the accumulation response was mitigated. Accumulation cycles ranged from 5 to 24 hours and the final level of PHA in the biomass ranged from 30 to 60% of dried biomass after accumulation. After an accumulation cycle, aeration was discontinued and the biomass was settled by gravity. Residual VFA levels in the reactor at the end of accumulation were negligible. The overlying treated wastewater was decanted. The gravity settled and thickened biomass was the starting raw feed for assessment of PHA-in-biomass stability and the PHA-resin recovery from this PHA-rich biomass.

The PC-F was batch fed with butyric acid as RBCOD source at laboratory scale. At the end of accumulation, the biomass was centrifuged and the supernatant was decanted. The thickened biomass of PHA-rich *C. necator* was freeze dried directly. This freeze dried biomass was used as the starting material for considering PHA stability in this pure culture PHA-rich biomass.

Thermal Stability of PHA-in-Biomass and the Biomass Inorganic Fraction

Figure 3:
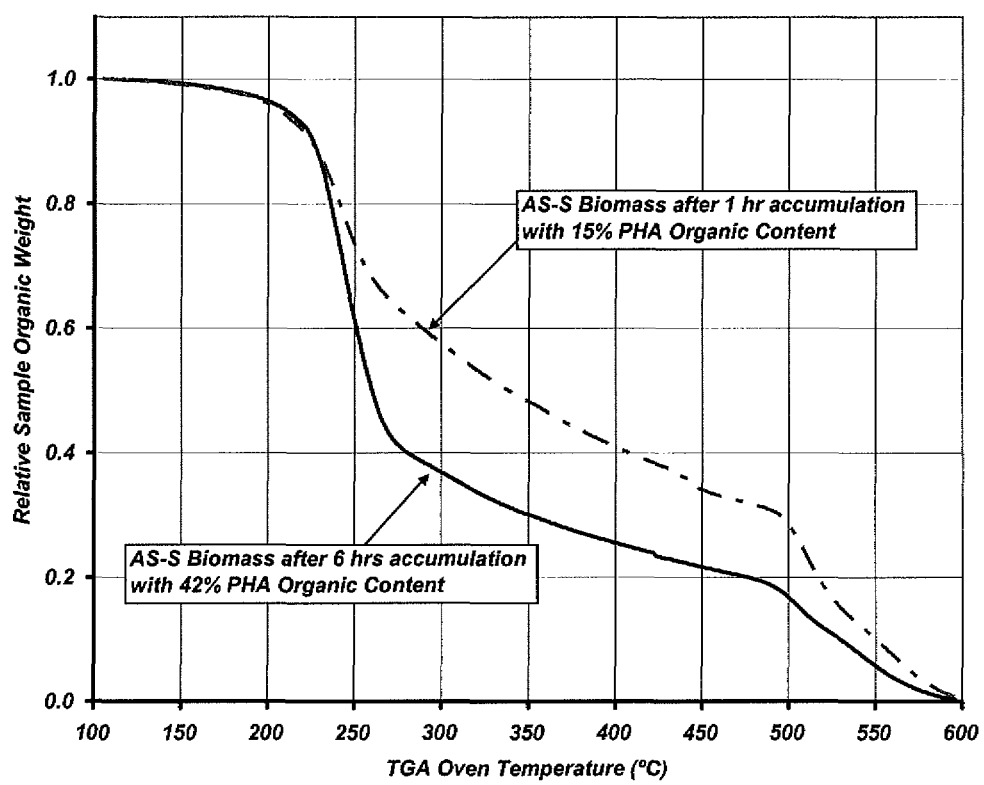
FIG. 3. TGA for dried AS-S biomass during PHA accumulation.
Figure 4:
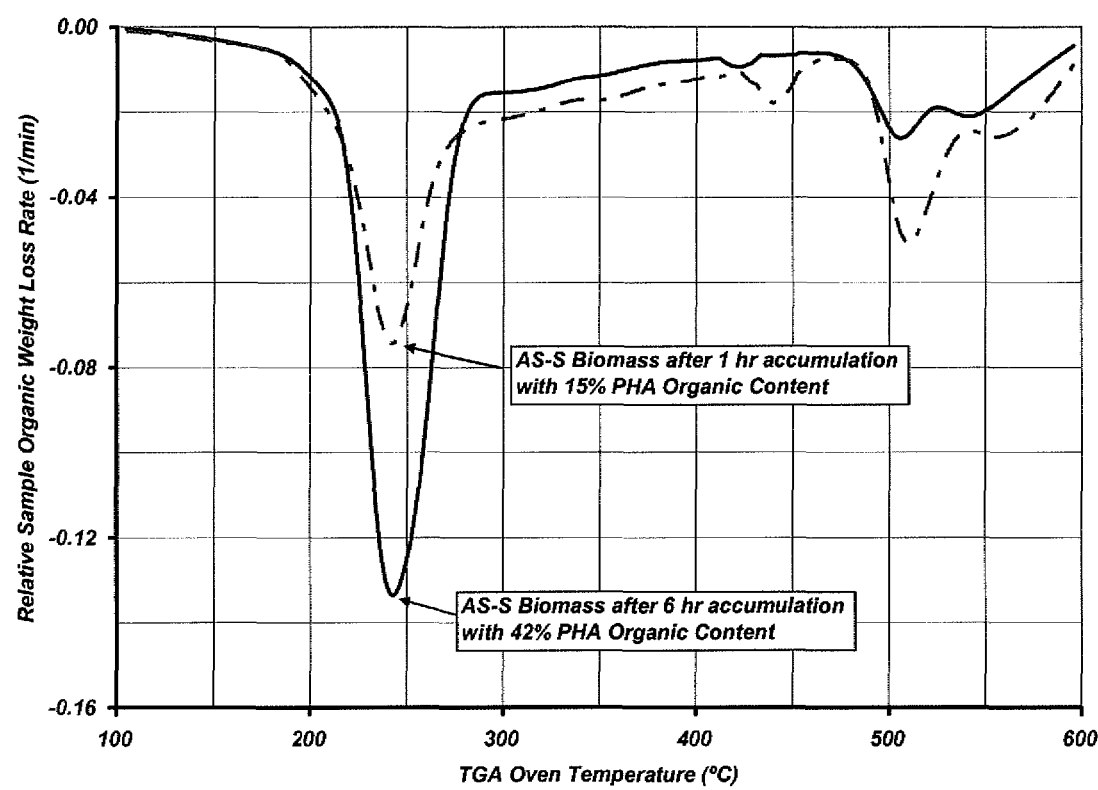
FIG. 4. Relative weight loss rate for dried AS-S biomass.
Figure 5:
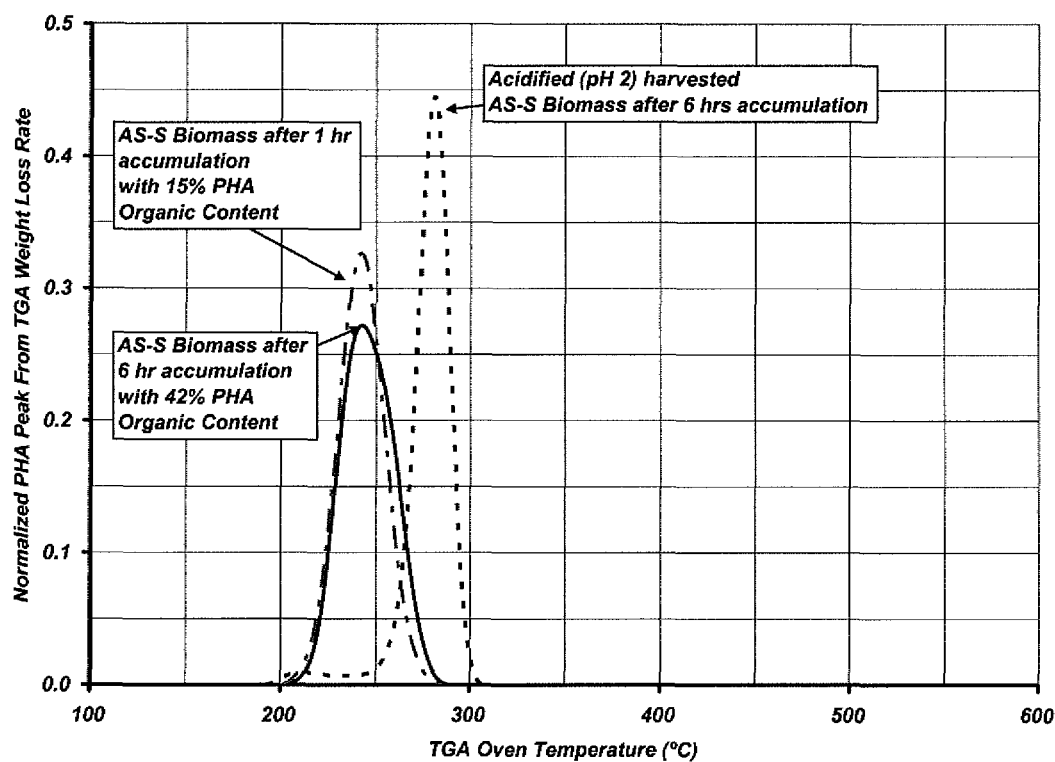
FIG. 5. Normalized PHA-in-biomass weight loss rate and the effect of biomass pH conditioning on decomposition temperature.

TGA of biomass samples provides information of biomass inorganic fraction and the quantity and the thermal stability of PHA in the biomass. The inorganic fraction of the biomass was estimated from the residual weight of the sample after reaching an oven temperature of 600° C. (FIG. 3). The term inorganic fraction or biomass-ash will be used to refer to the estimated TGA sample residual remaining after bringing the sample up to 600° C. in air. After the ash content was estimated, the sample weight less the estimated ash content, that is to say the estimated organic sample weight, was considered further. TGA indicates a progressive decrease in relative sample organic weight terminating asymptotically to a relative weight of zero. The quantity and quality of the PHA in the biomass can be evaluated from the rate of mass loss as a function of temperature (FIG. 4 and FIG. 5). Following our standard method for TGA with a ramp of 10° C./min, the PHA in the biomass is identified by a characteristic peak of weight-loss-rate that typically occurs between 200 and 300° C. The higher the temperature for the PHA peak the more thermally stable the PHA is in the biomass. For the purpose of this disclosure, the PHA-in-biomass decomposition temperature ($T_d$) is defined by the temperature of greatest weight loss rate for the PHA in the biomass even though decomposition starts below this temperature and continues after. Characteristic PHA decomposition temperatures can also be defined by percentiles of decomposition for the PHA in the biomass, such as the 5 ($T_5$), 25 ($T_{25}$), 50 ($T_{50}$), 75 ($T_{75}$), and 95 ($T_{95}$) percentiles. In some instances it is also informative to identify the fractional PHA decomposition at a fixed temperature such as 250° C. ($f_d^{250}$). From the trend of TGA of biomass organic content, one observes a PHA organic biomass fraction, and a non-PHA organic fraction, and the thermal stability of the PHA-in-biomass.

Figure 6:
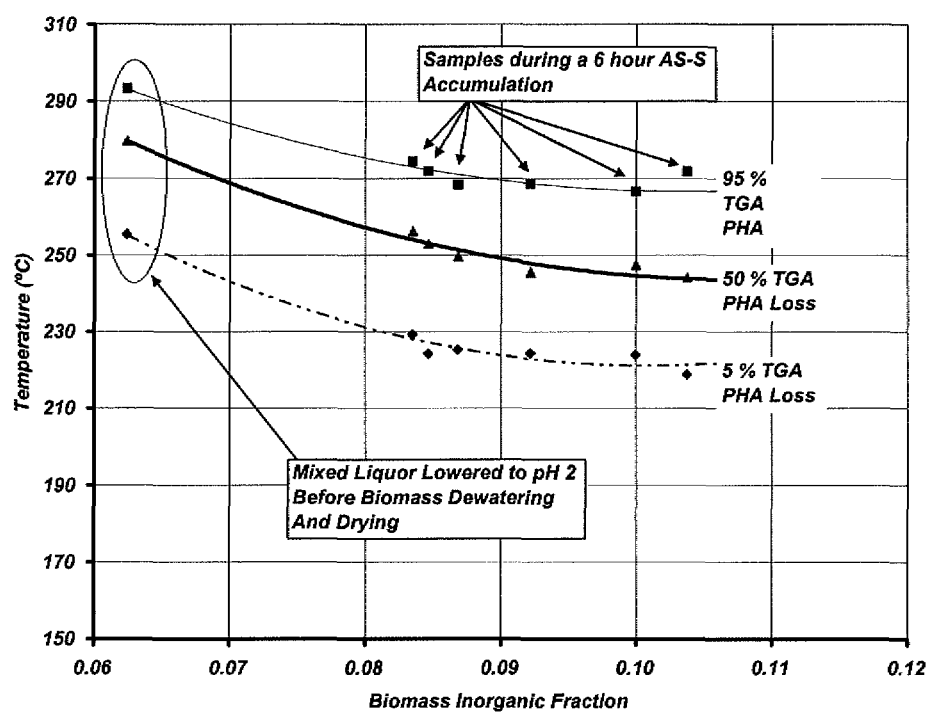
FIG. 6. Effect of biomass inorganic fraction and biomass pH conditioning on PHA-in-biomass decomposition temperatures for AS-S PHA accumulation.

The thermal stability of the PHA in the biomass during an accumulation correlated negatively to the level of inorganic matter associated with the biomass. In general, reduced levels of inorganic matter in the biomass resulted in higher PHA thermal stability. The inorganic fraction of the biomass was reduced significantly by lowering the pH of the mixed liquor prior to final dewatering and drying (FIG. 6).

Figure 7:
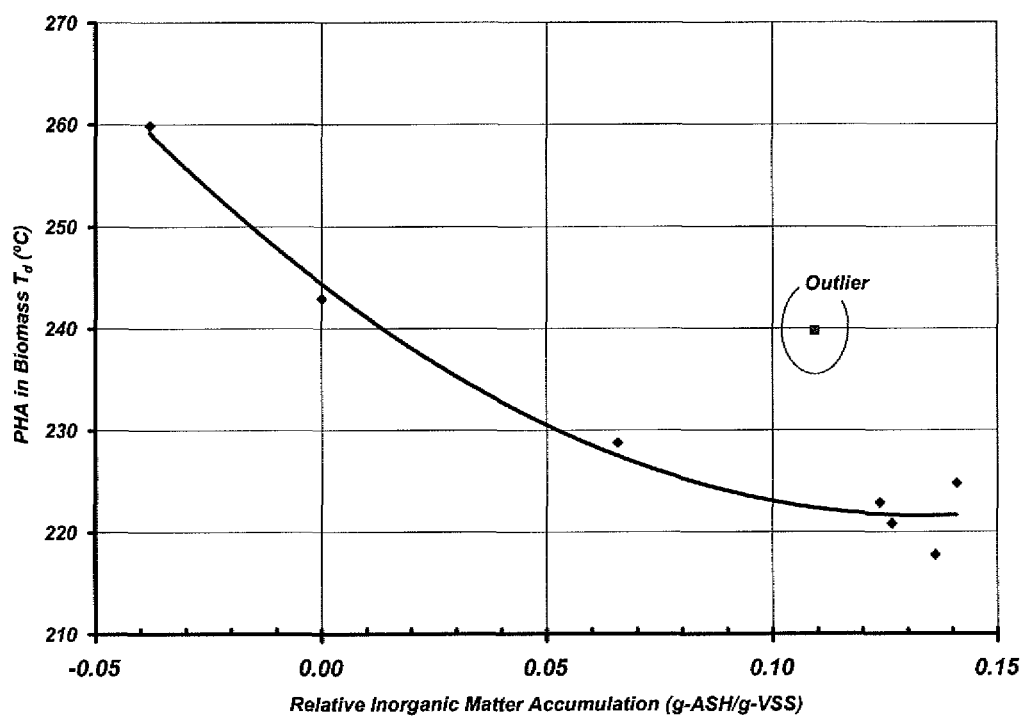
FIG. 7. PHA-in-biomass decomposition temperatures for eight replicate AS-S PHA accumulations with respect to inorganic matter accumulation concurrent with PHA storage.

Replicate accumulation experiments were performed with AS-S. PHA was accumulated in the biomass using either a chemical industry wastewater rich in butyric acid or a dairy industry wastewater rich in butyric and acetic acids. The pH during PHA accumulation was uncontrolled but was typically within the range from pH 7.5 to pH 9. At the end of every PHA accumulation, a biomass sample was centrifuged and the supernatant was decanted. The remaining concentrated pellet was dried at 70° C. It was observed that the thermal stability of PHA-in-biomass was not consistent but varied for each run. In parallel to PHA accumulation (g-VSS), the biomass was also observed to become associated with increased levels of inorganic matter to varying degree for each experiment. The thermal stability of PHA-in-biomass at the end of an accumulation experiment correlated negatively to the level of concurrent inorganic matter assimilation (g-ash) by the biomass. The one outlier suggested that the kind of inorganic matter, and not just the level, needed to be considered further (FIG. 7).

Focus on the Biomass Inorganic Fraction

To better understand the role of the ash content in the biomass with respect to the PHA-in-biomass thermal stability, samples of biomass from separate accumulation experiments were sent for elemental analysis. Dewatered and dried samples of biomass taken before PHA accumulation (2 samples), after PHA accumulation (3 samples), and after mixed liquor acidification before final dewatering (3 samples) were selected.

Figure 8:
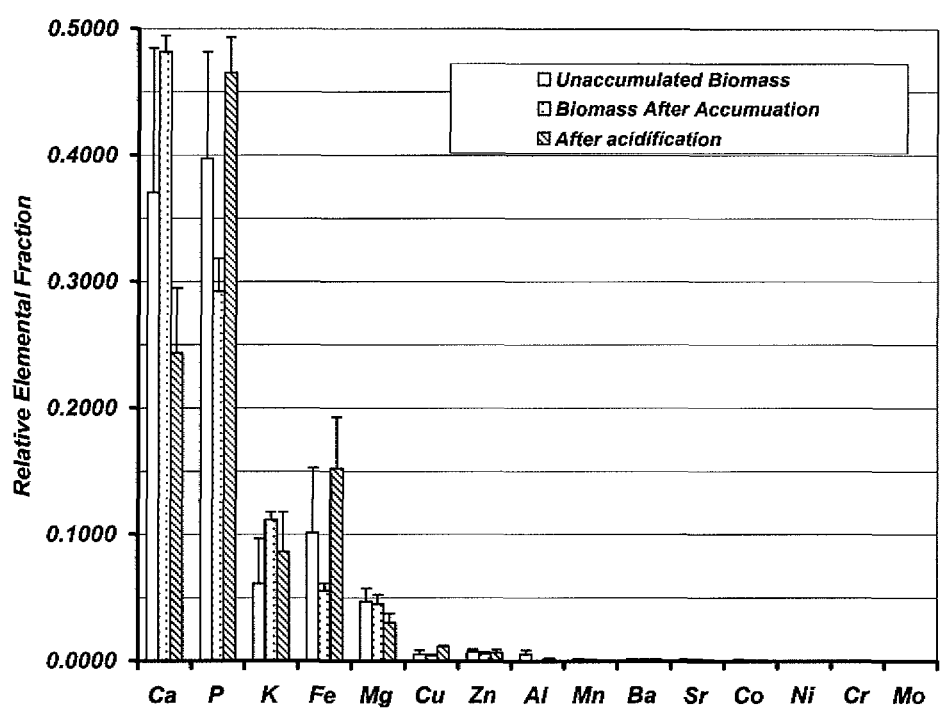
FIG. 8. Relative inorganic mass fraction of biomass prior to PHA accumulation, at the end of PHA accumulation, and after acidification (biomass pH-conditioning).

The relative inorganic composition of the biomass was consistent and dominated by calcium and phosphorus, followed by potassium, iron and magnesium (FIG. 8). Copper, zinc, and aluminium were next in relative abundance representing relative content levels of approximately 1%. Manganese, barium, strontium, cobalt, nickel, chromium, and molybdenum were minor components at relative levels of a fraction of 1%. Group I and II metals such as $Ca^{+2}$, $Mg^{+2}$, and $Na^{+1}$ are elements known from the literature to influence the thermal stability of PHA. PHA thermal stability has also been previously shown to be hardly affected by the metals $Zn^{+2}$, $Sn^{+2}$ or $Al^{+3}$. The assessed relative calcium content of the biomass before accumulation was most variable. However, PHA accumulation seemed to be associated with a consistent trend of marked increase of the relative calcium and phosphorus component of the inorganic content. Similarly, acidification of the mixed liquor after PHA accumulation, before final dewatering and drying, was observed to promote a significant decrease in the relative calcium content of the biomass ash content.

From at least a water chemistry perspective, these observations of calcium increase during the accumulation process are understandable. The accumulation process converts RBCOD in the water to PHA and carbon dioxide. With increased pH, larger fractions of the produced carbon dioxide will be retained in solution as carbonate. The tendency for calcium carbonate mineral formation will increase with increased concentration of calcium and/or carbonate. Alkaline pH promotes the mineral formation while acidic pH favours the mineral solubility. Other minerals of calcium, including calcium phosphate, may also be formed with a similar tendency of increased solubility with decreased pH. Other cations like magnesium will behave similarly to calcium.

Figure 9:
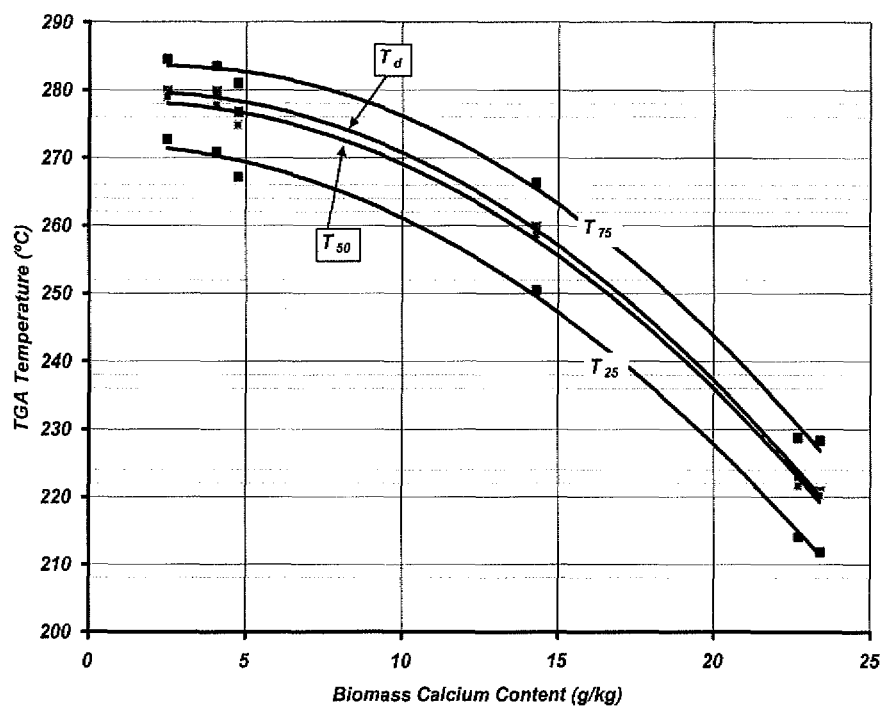
FIG. 9. Biomass calcium content correlated to the PHA-in-biomass decomposition temperatures for AS-S biomass.
Figure 10:
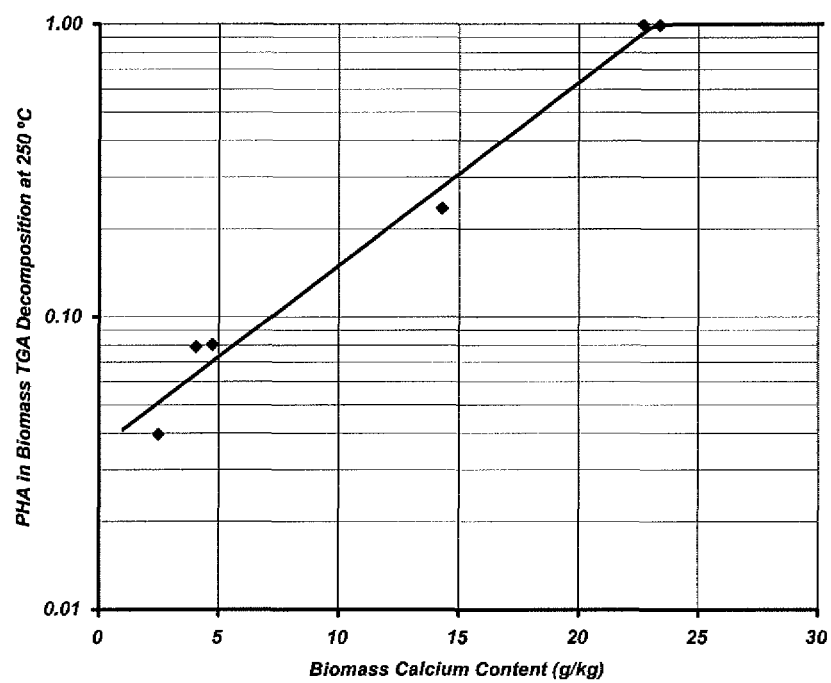
FIG. 10. Biomass calcium content correlated to the fraction of PHA-in-biomass decomposition at 250° C. for AS-S biomass.

The calcium content of the biomass correlated strongly to phosphorus, potassium, magnesium, manganese, barium and strontium. Since calcium dominated the biomass ash content while also being known as an element which can influence PHA thermal stability, the apparent relationship between the measured biomass calcium content and the PHA-in-biomass thermal stability (FIG. 9 and FIG. 10) was considered. The trends did not seem to be sensitive to differences in the biomass PHA content which ranged from 40 to 50% for these samples. Reduction of the calcium mineral content in the biomass was associated with a progressive increase in the temperature range representing PHA decomposition in the biomass. The effect did not appear to be progressive but diminished to limiting values. The PHA-in-biomass decomposition shifted from a lower temperature range of 210 to 230° C. up to a temperature range of 270 to 290° C. (FIG. 9). The extent of PHA-in-biomass decomposition at 250° C. was reduced from 100 to less than 10% (FIG. 10).

If PHA is to be extracted from the biomass using an organic solvent at temperatures above 100° C., and thermal decomposition of the PHA in the biomass is to be avoided, then a high PHA-in-biomass thermal stability is necessary. Thermal stability of PHA-in-biomass in replicate accumulation experiments was variable with a $T_d$ ranging from 220 to 260° C. Acidification of the mixed liquor before final biomass dewatering and drying increased the $T_d$ to a consistent level in excess of 280° C. The extent of acidification required can be operationally defined as a pH reduction giving rise to a dried biomass with a PHA-in-biomass decomposition temperature greater than 270° C. but preferably in excess of 280° C.

The Role of PHA-in-Biomass Thermal Stability Before Solvent Extraction

Figure 11:
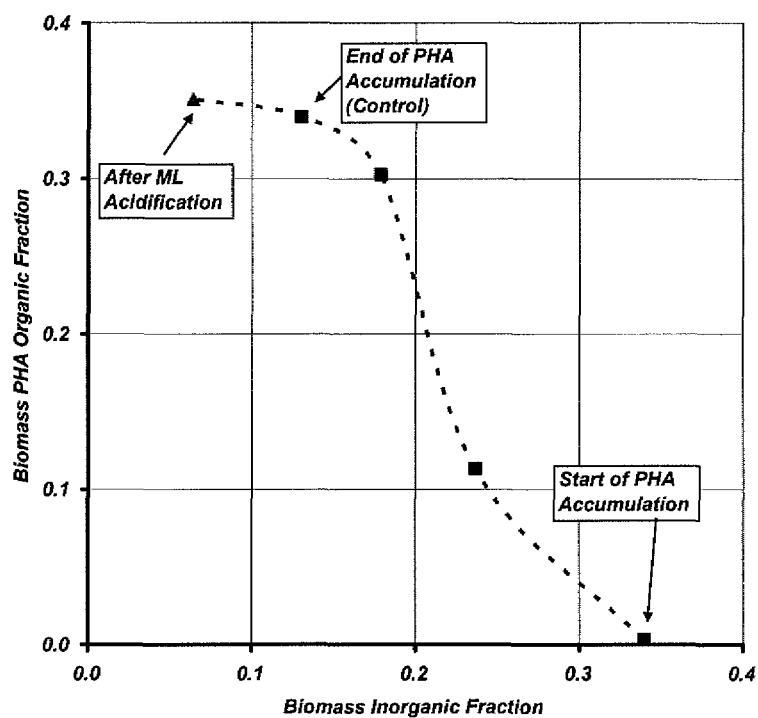
FIG. 11. PHA-in-biomass and biomass inorganic fractions during AS-F PHA accumulation.
Figure 12:
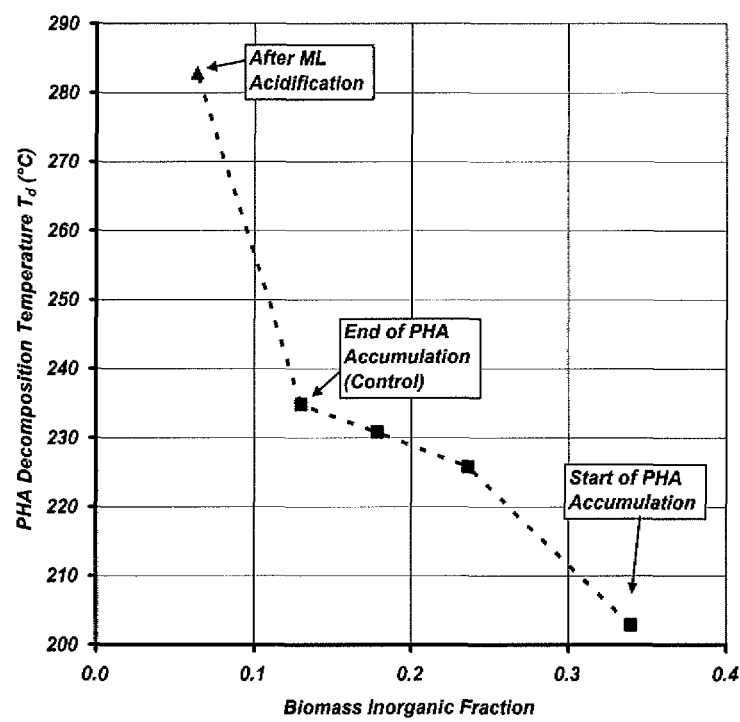
FIG. 12. PHA-in-biomass decomposition temperature with respect to the changing biomass inorganic fraction for AS-F PHA accumulation.
Figure 13:
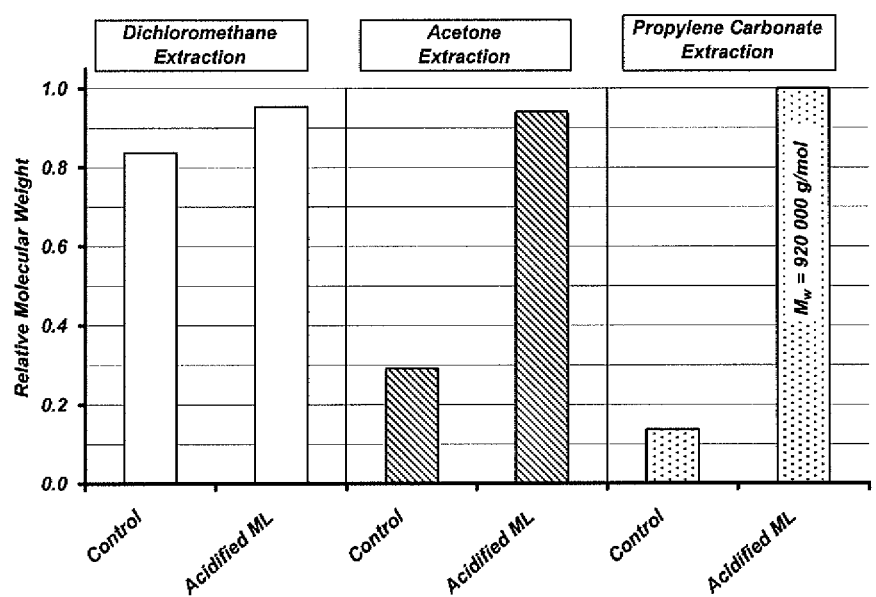
FIG. 13. Effect of solvent extraction on PHA molecular weight from dried AS-F control and after mixed liquor (ML) acidification.

The importance of conditioning the biomass to increase the PHA thermal stability was similarly illustrated by accumulation experiments performed with AS-F biomass (FIG. 11, FIG. 12, and FIG. 13). Biomass samples, dried at 70° C., were taken prior to PHA accumulation, after PHA accumulation and dewatering (control sample) in which the pH was between 7 and 9, and after PHA accumulation with a pH adjustment to 3 and subsequent concentration steps including dissolved gas flotation and centrifugation up to 150 g/L. During accumulation, the biomass inorganic fraction decreased progressively and acidification resulted in further decrease which yielded the most significant increase in PHA-in-biomass decomposition temperature.

Failure to achieve a higher PHA-in-biomass thermal stability resulted in significant molecular weight loss during extraction at 125° C. for 2 hours using either acetone or 1,2-propylene carbonate solvent (non-chlorinated) systems. Some molecular weight decrease was also observed for dichloromethane extraction at 40° C. PHA-resin purities for the control and acidified mixed liquor (ML) extractions were 96 and 93 (dichloromethane), 96 and 97 (acetone), and 97 and 95 (propylene carbonate) percent, respectively. PHA-resin polydispersity was 1.8±0.2. In all the respective extraction solvents tested in this experiment, the biomass preconditioning by acidification of the mixed liquor (ML) yielded superior results (FIG. 13). Polymer extraction yield can be increased with longer extraction time and molecular weight loss has been observed to follow first order kinetics. Therefore, a trade-off between extraction yield and molecular weight loss may sometimes be inevitable. Such trade-offs can be mitigated by improved thermal stability of the PHA-in-biomass before extraction.

Figure 14:
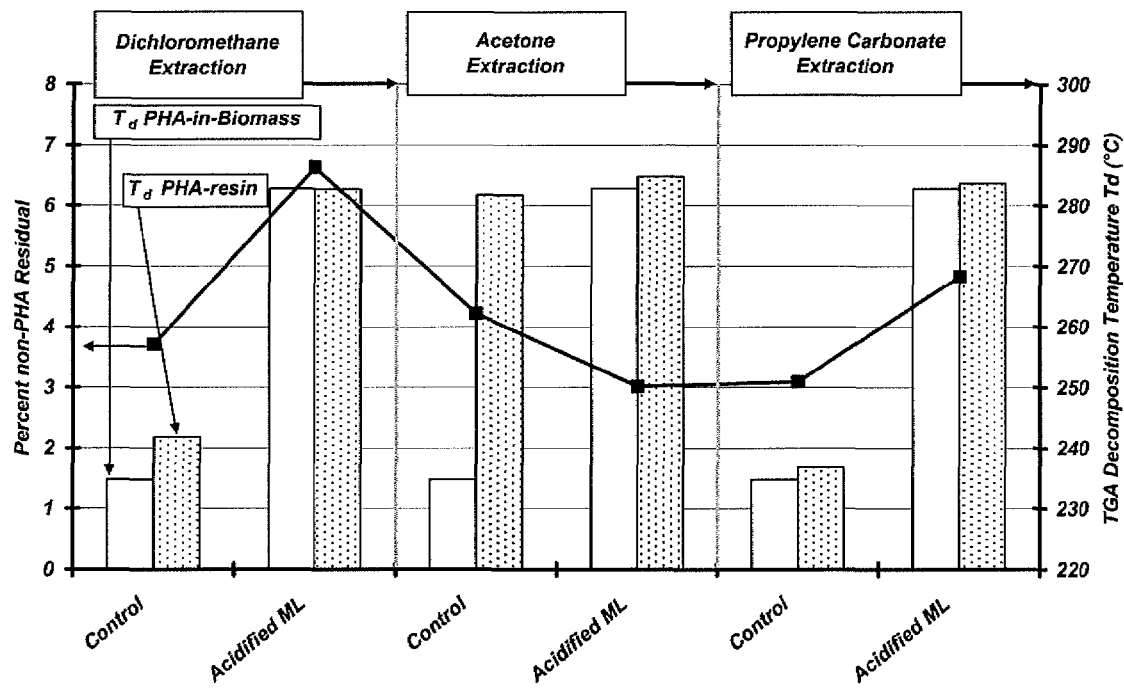
FIG. 14. Effect of solvent extraction on non-PHA residual mass fraction and decomposition temperature for control and after mixed liquor (ML) acidification for AS-F PHA-in-biomass and resultant PHA-resin.

Molecular weight loss (FIG. 13), however, did not influence the $T_d$ of the extracted PHA-resin (FIG. 14). Acidification of the mixed liquor (ML) resulted in a higher PHA-in-biomass $T_d$ and acetone extraction resulted in a PHA-resin with even further improved thermal stability (FIG. 14). In contrast, the dichloromethane and propylene carbonate extraction resulted in a PHA-resin thermal stability that was more similar to the PHA-in-biomass $T_d$. $T_d$ for the PHA-resin after extraction did not correlate with the TGA-derived non-PHA residual mass fraction.

Thus, biomass conditioning to improve PHA-in-biomass thermal stability can reduce extent of molecular weight loss during biomass drying and solvent extraction. In addition, pre-conditioning leading to PHA-in-biomass $T_d$ improvement is translated to the PHA-resin after extraction. Furthermore, acetone as a PHA extraction solvent exhibited a distinct attribute of further improving PHA-resin thermal stability over and above the starting PHA-in-biomass $T_d$. Extracted PHA-resin purity was not indicative of the resultant $T_d$.

TGA parameters for assessment of the extracted PHA-resin discovered to be indicative of improved PHA-resin melt stability are the PHA decomposition fraction at 250° C.). ($f_d^{250}$) and the temperature at 5% PHA-resin decomposition ($T_5$). The higher $T_5$ and the lower $f_d^{250}$ are the better the quality will be for the PHA-resin melt stability. Acetone extraction provided for consistently low PHA-resin $f_d^{250}$ in both cases. Preconditioning the PHA-in-biomass thermal stability and the type of solvent used can influence the resultant processing quality of the PHA-resin.

Testing Principles on Pure Culture Biomass

The PHA production process has been established in conjunction with sludge management activities at wastewater treatment facilities. However, we nevertheless wished to clarify if the principles of this disclosure were equally relevant for PHA production based on processes of pure culture fermentation for PHA production. To this end, a sample of PC-F was dewatered by centrifugation and freeze dried directly after PHA accumulation. The organic fraction of the PC-F biomass was approximately 81% PHA by weight. The principle of preconditioning the PHA in the biomass was tested albeit starting from an already dried biomass.

The PC-F was divided into 3 fractions, namely, a reference, a de-ionised water rinse, and an acidic water rinse. The reference was the as received PC-F biomass assessed and extracted without any form of preconditioning. Rinsing was accomplished by combining 45 mL of rinse solution (deionized water or 0.001 N hydrochloric acid, respectively) per gram of biomass and continuous mixing at room temperature for 25 minutes. Finally, after rinsing, those biomass fractions were dewatered by centrifugation thereafter the supernatants were decanted and the retained biomass was dried at 70° C.

Figure 15:
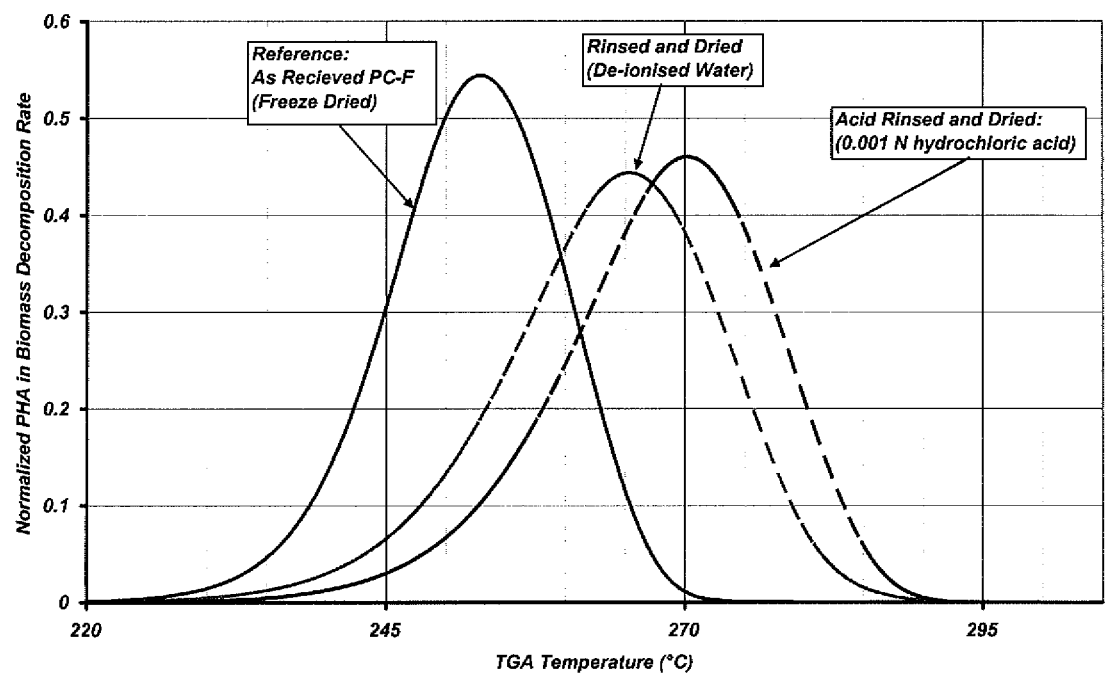
FIG. 15. Normalized TGA decomposition rates of PHA-in-biomass for PC-F freeze-dried and preconditioned biomass.
Figure 16:
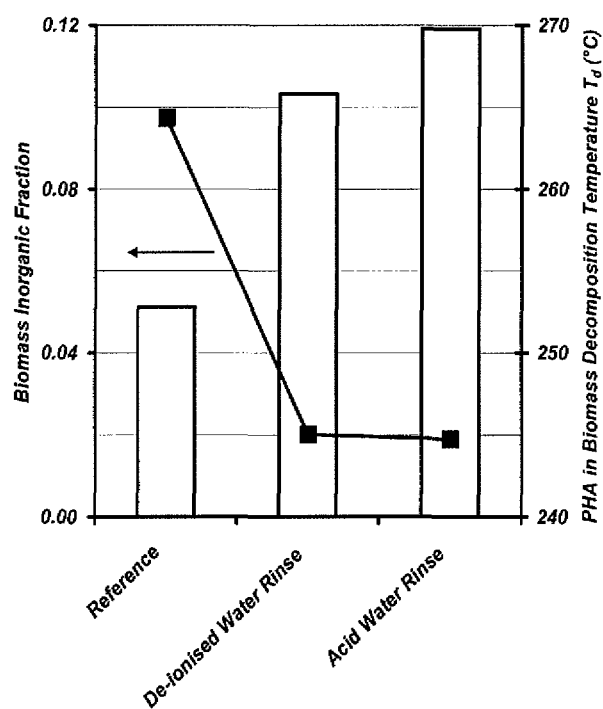
FIG. 16. Effect of PC-F preconditioning on the biomass inorganic fraction and the PHA-in-biomass decomposition temperature.
Figure 17:
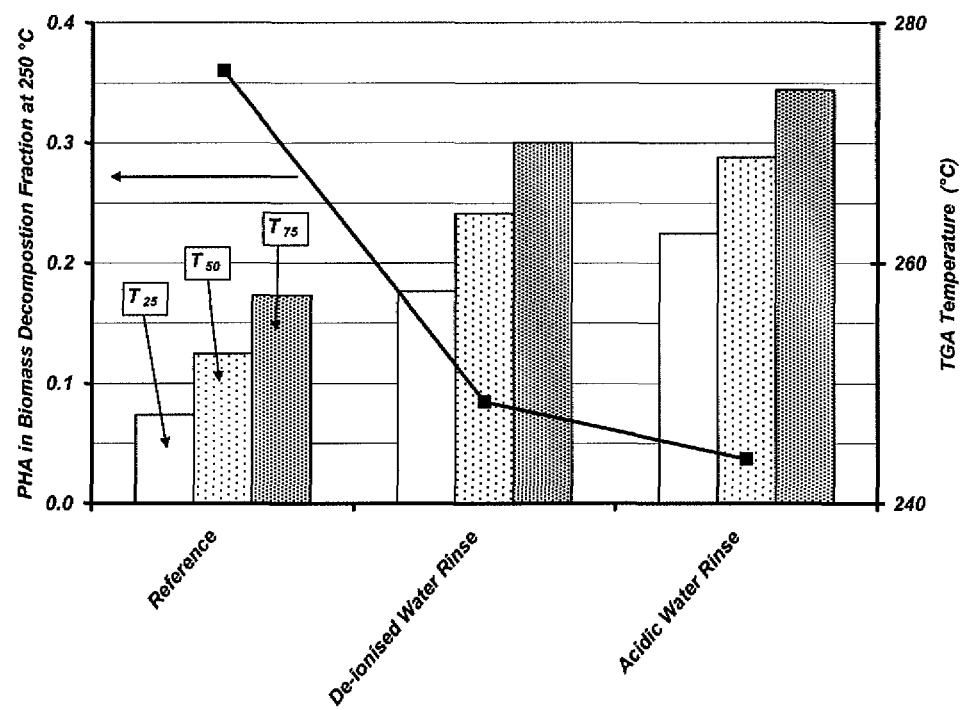
FIG. 17. Effect of PC-F preconditioning on the fraction of PHA-in-biomass decomposition and decomposition temperature for the PC-F biomass.

The thermal stability of the PHA-in-biomass was examined by TGA (FIG. 15). Rinsing the PC-F biomass promoted a significant improvement of the PHA-in-biomass thermal stability. The improvement is analogous to results on AS-S and AS-F for acidification of the mixed liquor before final biomass dewatering and drying. As for AS-S and AS-F, an acidic rinse of PC-F gave the most improvement for PHA-in-biomass thermal stability. Extent in improvement for PHA-in-biomass decomposition temperature ($T_d$) was not as high as was achieved for AS biomass. A PHA-in-biomass $T_d$ neighbouring 280° C. was achieved for AS-S and AS-F, while PC-F reached a $T_d$ of almost 270° C. following the acidic rinse (FIG. 15 and FIG. 16). This difference may have been influenced by the conditioning of an already dried biomass, rather than preconditioning directly after accumulation as for the trials with AS-S and AS-F. Notwithstanding, the extent of decomposition of the PHA-in-biomass at 250° C. was similar to AS, being less than 10% after acidic conditioning (FIG. 17). Preconditioning of the PC-F before solvent extraction similarly resulted in a reduced inorganic fraction of the biomass (FIG. 16), and the PHA organic fraction was increased slightly to 83%. The fundamental observations and principles of manipulating PHA-in-biomass thermal stability were reproduced and found to be equally valid for pure culture solvent extraction of PHA-resin.

Figure 18:
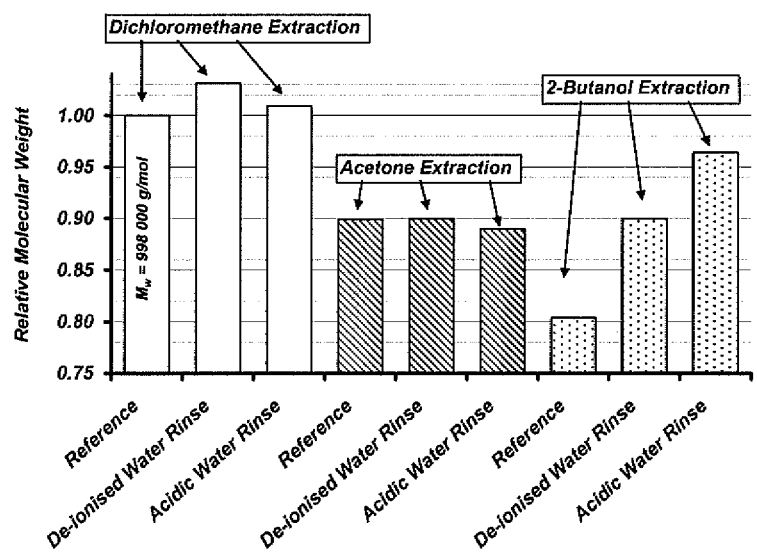
FIG. 18. Effect of solvent extraction on relative PHA molecular weight from PC-F biomass without and with pre-conditioning rinse.
Figure 19:
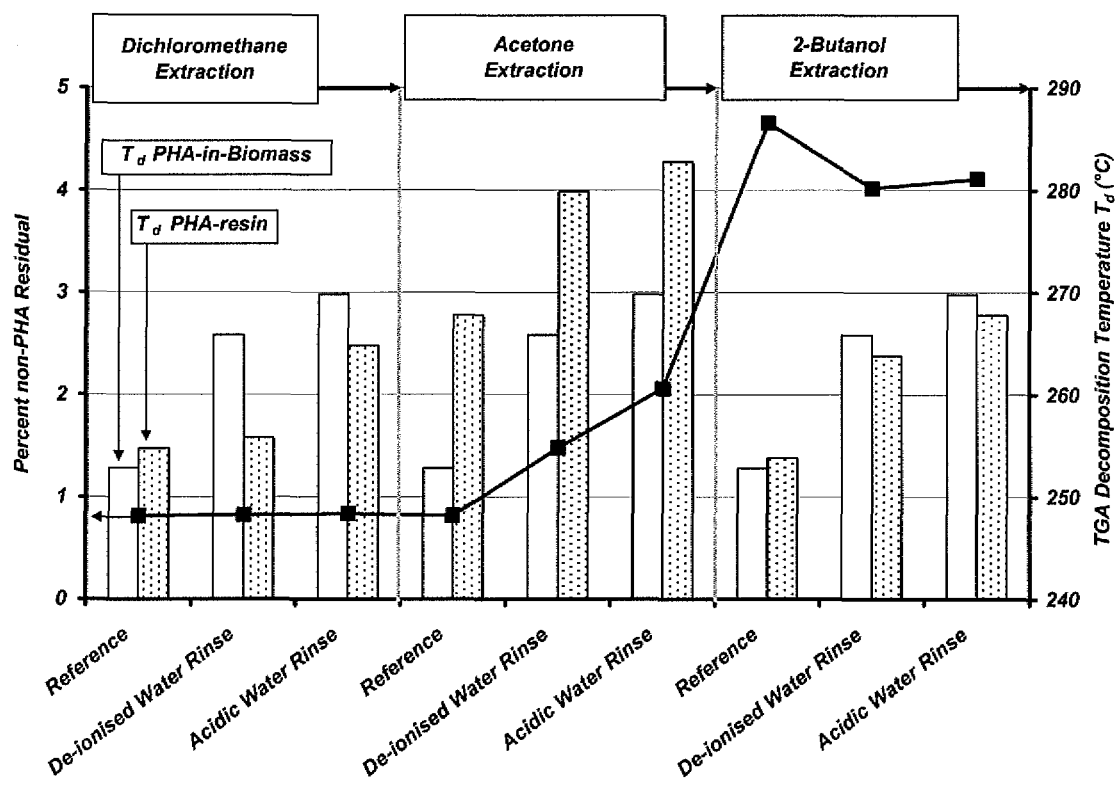
FIG. 19. Effect of solvent extraction solvent and pre-conditioning on non-PHA residual mass fraction and decomposition temperature for PHA-in-PC-F biomass and PHA-resin.
Figure 20:
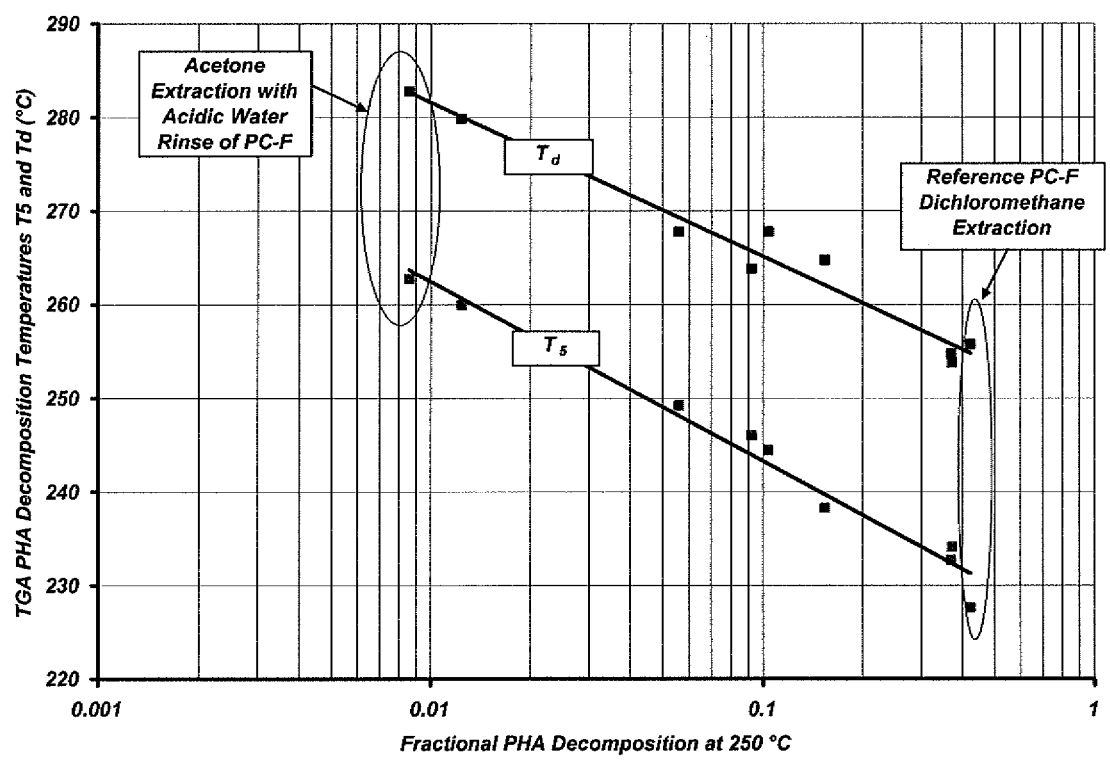
FIG. 20. Thermal stability of PHA resin considering decomposition temperatures $T_5$ and $T_d$ with respect to PHA fractional decomposition $f_d^{250}$.

The PHA was extracted from the PC-F biomass at low temperature (40° C.) and at high temperature (125° C.) using three different solvent systems (dichloromethane at 40° C., acetone at 125° C. and 2-butanol at 125° C.). The extracted polymer was analyzed by SEC for molecular weight distribution (FIG. 18), as well as by TGA for PHA-resin thermal stability and purity (FIG. 19 and FIG. 20). The highest average molecular weight was obtained with low temperature dichloromethane extraction on the freeze dried PC-F biomass. In contrast to AS-F biomass (FIG. 13), acetone extraction resulted in only a 10% loss in molecular weight that was insensitive to either de-ionized or acidic water rinsing of the biomass. However, the influence of rinsing the biomass on extracted average molecular weight was most evident for 2-butanol extraction. After the acidic rinse of the PC-F biomass, the 2-butanol extraction yielded PHA with a similar molecular weight distribution to the reference extraction with dichloromethane. While PHA was more susceptible to molecular weight loss in 2-butanol at elevated temperatures, pre-conditioning of the PC-F biomass improved the stability of PHA for 2-butanol extraction. The polydispersity for all samples was relatively constant at 1.8±0.3.

The rinse preconditioning exhibits potential to mitigate PHA average molecular weight loss during solvent extraction processes at temperatures greater than 100° C. Notwithstanding potential benefits of molecular weight preservation, the rinse preconditioning may serve to produce an extracted PHA with resistance to decomposition in the melt during subsequent processing. FIG. 19 contrasts the differences between PHA-in-biomass and PHA-resin thermal stabilities after respective extractions. Similar to the results for the AS-F propylene carbonate extractions discussed above, dichloromethane and 2-butanol extractions followed trends of PHA-in-biomass $T_d$. $T_d$ of PHA-resin for 2-butanol extractions reflected the extant PHA-in-biomass $T_d$ before extraction. $T_d$ of PHA-in-biomass improved with biomass conditioning but during dichloromethane extractions the $T_d$ for PHA-resin was consistently lowest. In agreement to reported AS-F extraction outcomes, acetone extraction augmented PHA-resin $T_d$ above the respective PHA-in-biomass thermal stability.

Acid rinsed and acetone extracted PC-F exhibited the highest $T_d$ of 283° C. compared to a $T_d$ of 255° C. for the reference dichloromethane extracted PC-F. Improved extracted PHA-resin thermal stability was not coupled to improved purity in the extracted product (FIG. 19). Therefore, PHA-resin chemical purity is not synonymous with improved functional stability that involves practical issues such as melt stability. A purer PHA-resin is not necessarily better from practical plastic processing perspectives.

Figure 21:
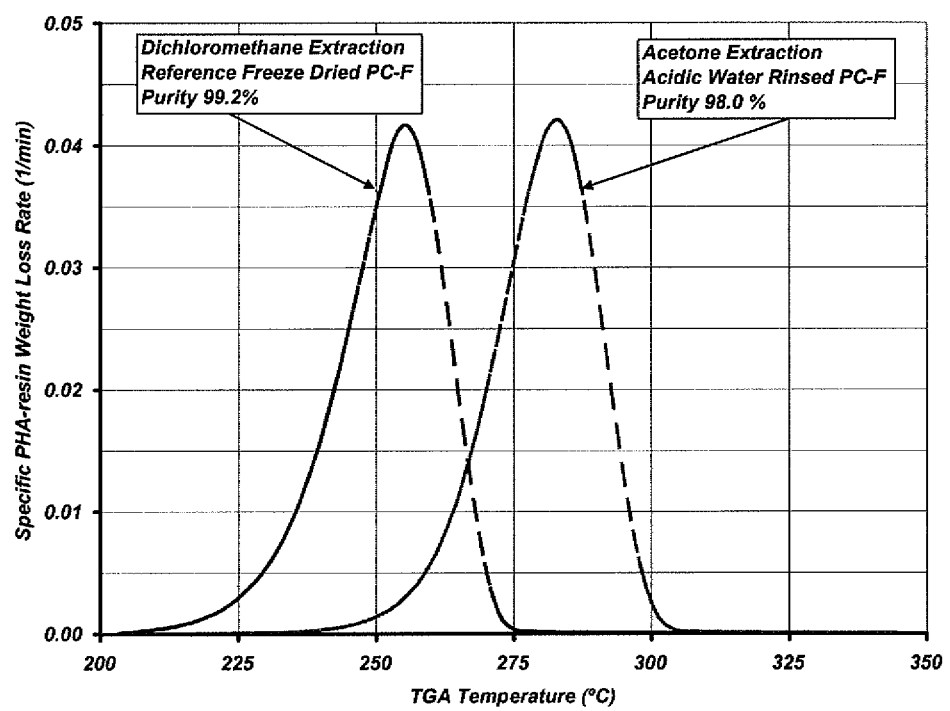
FIG. 21. Influence of acidic water rinse in combination with acetone extraction on PC-F with respect to the PHA-resin decomposition rate.

TGA parameters for analysis of the extracted PHA-resin discovered to be indicative of improved melt stability are the PHA decomposition fraction at 250° C. ($f_d^{250}$) and the temperature at 5% PHA-resin decomposition ($T_5$). The higher $T_5$ and the lower $f_d^{250}$ the better the quality the PHA-resin for melt stability will be. FIG. 20 illustrates the coupling of $f_d^{250}$ and $T_5$ depending on rinse method and solvent for extraction. An acidic rinse of PC-F, re-drying and acetone extraction gave optimal results for $f_d^{250}$ and $T_5$ even though purity was not as good as the acetone or dichloromethane extracted reference PC-F (FIG. 21).

Therefore PHA-resin purity is perhaps a lesser factor than the kind of impurity if functional quality is to be considered an attribute of the product. Further, results were replicated where preconditioning PHA-in-biomass to improve thermal stability was implicated in preserving molecular weight for hot solvent extraction. The higher the PHA-in-biomass thermal stability, the more thermally stable the extracted PHA resin will tend to be. At the same time, the type of solvent used for extraction can influence the outcome.

In view of the practical importance of the PHA-resin melt stability, and that thermal stability was not well-correlated to the extracted PHA-resin purity, purity was further investigated between our mixed culture PHA and commercial pure culture PHA while also working to establish coupling between data of TGA decomposition, polymer melt rheology, and the melt stability.

Inorganic Impurities and PHA-Resin Thermal Stability

Figure 22:
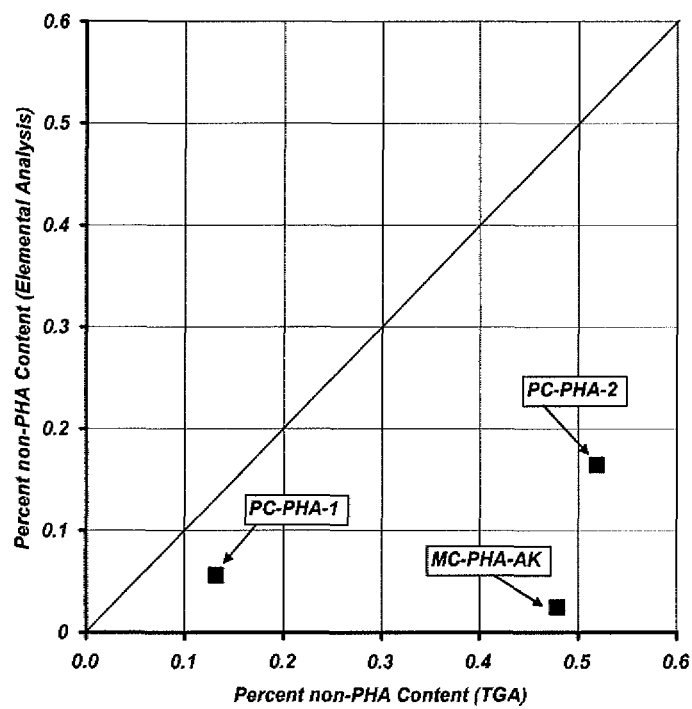
FIG. 22. Non-PHA content comparison of PHA-resin produced from mixed culture (MC-PHA-AK) using AS-S and commercial grades of PHA-resin derived from pure culture fermentation processes (PC-PHA-1 and 2).
Figure 23:
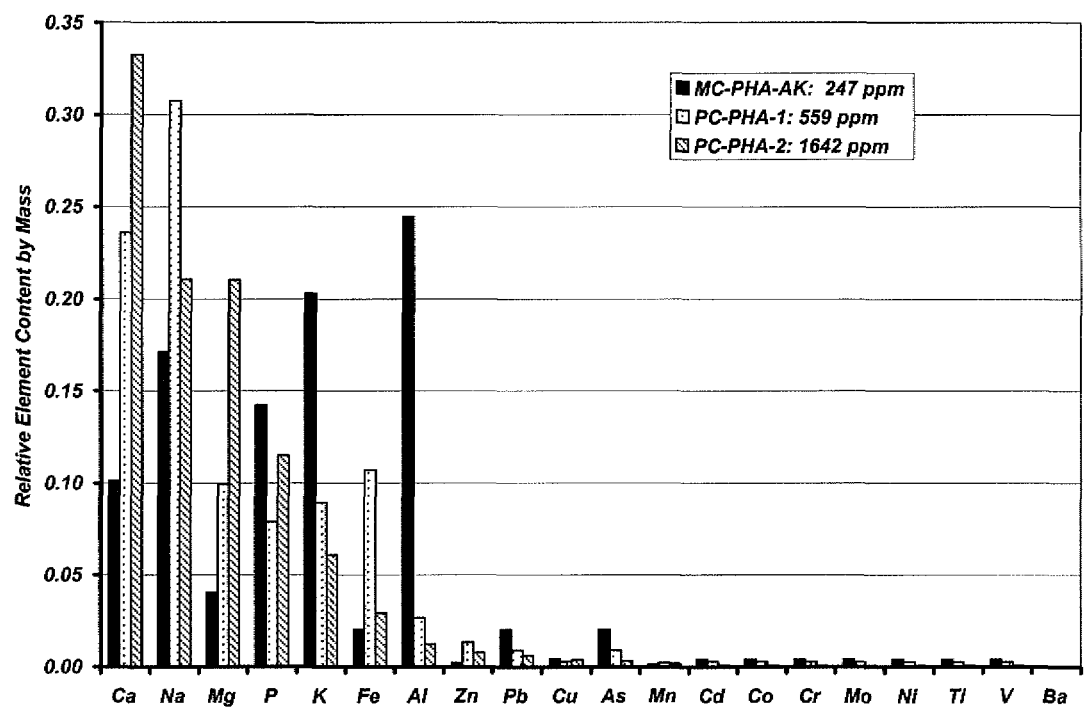
FIG. 23. Estimated PHA-resin inorganic element content from mixed culture (MC-PHA-AK) using AS-S and commercial grades of PHA-resin derived from pure culture fermentation processes (PC-PHA-1 and 2).

A sample of AS-S PHA-resin (MC-PHA-AK), as well as two distinct commercial PHA-resin grades (PC-PHA-1 and PC-PHA-2), were analyzed for inorganic element content (FIG. 22 and FIG. 23). The MC-PHA-AK is derived from a mixed culture treating a dairy industry wastewater and the commercial PHAs were produced by pure culture (PC) fermentation processes. The TGA non-PHA content for these samples is based on the residual material fraction, with respect to the sample weight at 200° C., after the PHA weight loss peak and at a TGA temperature of 350° C. The non-PHA content from elemental analysis refers to the non-PHA fraction based on the mass of elements detected (FIG. 23). In terms of absolute purity (FIG. 22), PC-PHA-1 was exceptionally pure while the other two samples were comparable in purity. However, the estimated non-PHA content from TGA did not correlate to the summed non-PHA inorganic mass based on the elemental analysis.

Figure 24:
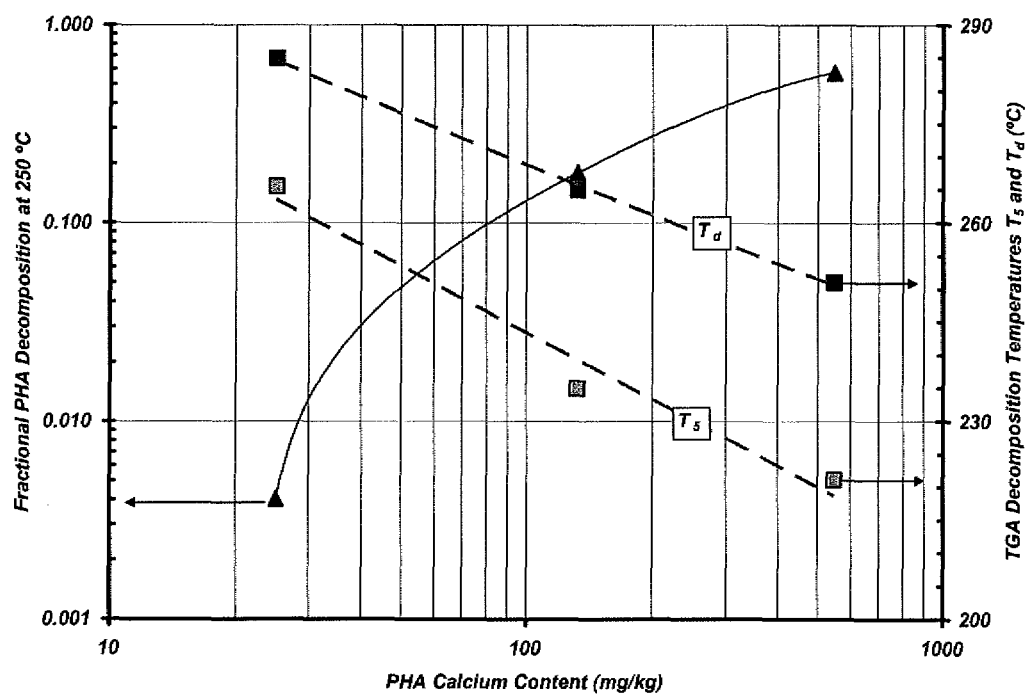
FIG. 24. Thermal stability of PHA-resin as a function of calcium content.

Based on the apparent PHA purity derived from elemental analysis (FIG. 23), the PHA-resin purity ranking changed to MC-PHA-AK, PC-PHA-1, and PC-PHA-2 with 247, 559, and 1642 mg/kg of quantified inorganic mass. Relative elemental composition varied but calcium, sodium, magnesium, phosphorus, potassium, iron and aluminium were found to be the principal contributors. The variation in calcium content of the PHA samples correlated strongly and positively with Na, Mg, P, K, Zn, Pb, Cu and Mn. The PHA calcium content correlated also strongly and negatively with the PHA-resin thermal stability (FIG. 24). Therefore, unlike the ranking in absolute purity, the functional quality of the PHA-resin was related the elemental content (FIG. 23) for which calcium was a dominant element.

Figure 25:
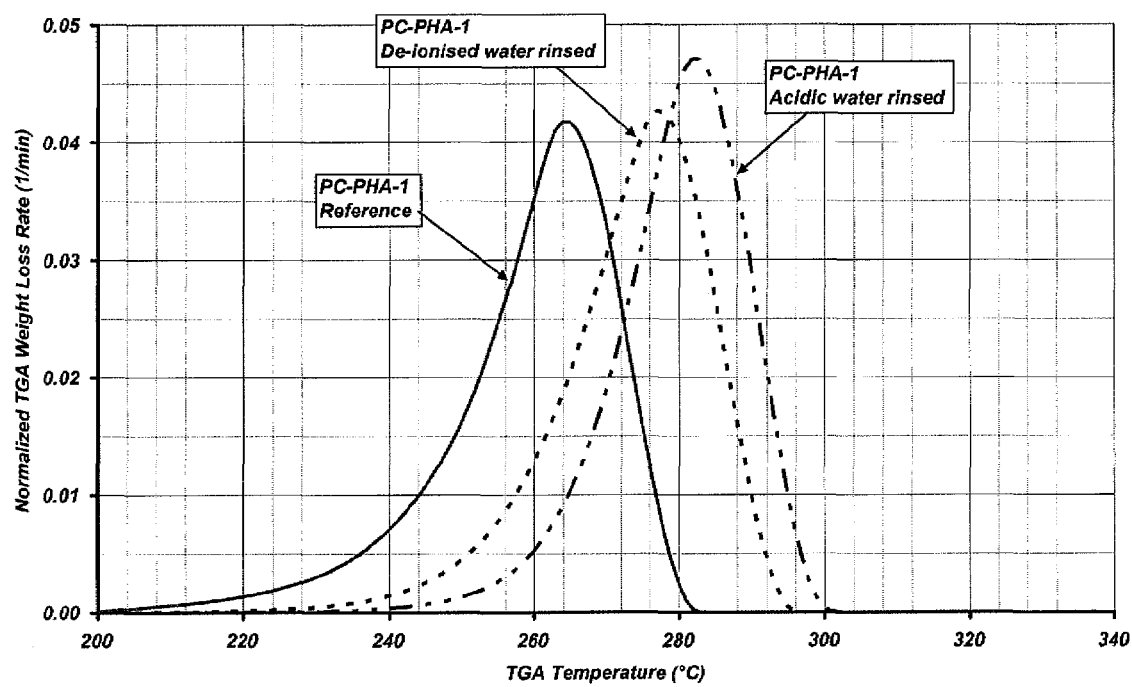
FIG. 25. Effect of rinsing and re-drying PC-PHA-1 with de-ionised and acidic water.
Figure 26:
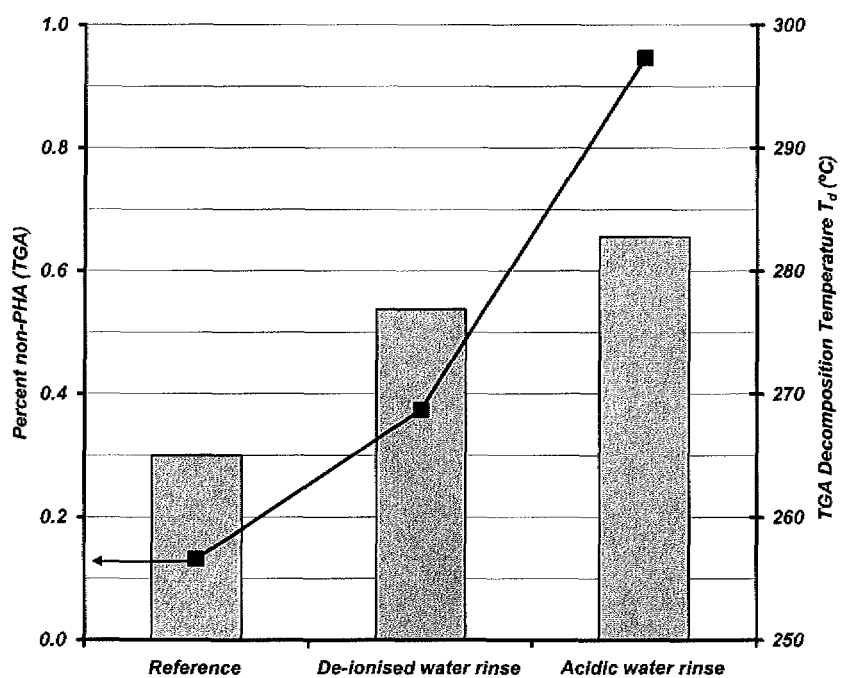
FIG. 26. Effect of rinsing PC-PHA-1 on the non-PHA content and PHA-resin thermal decomposition temperature.

To assess the nature of the association of these elements with the PHA-resin, the commercial PHA was rinsed with de-ionised or acidified water, re-dried and then tested again for changes in thermal stability. Rinsing and drying the PC-PHA-1 improved the thermal stability of the PHA-resin but introduced a slight increase of non-PHA content (FIG. 25 and FIG. 26). The improvement in stability was more significant with an acidic rinse which agrees in parallel to experience of influencing the PHA-in-biomass thermal stability. Absolute PHA-resin purity is not necessarily indicative of improved thermal stability. Elements which seem to influence the PHA-resin thermal stability are not strictly bound but readily become unassimilated from the polymer by washing at reduced pH. Minerals of cations such as calcium and magnesium are known to become more soluble in acid.

Figure 27:
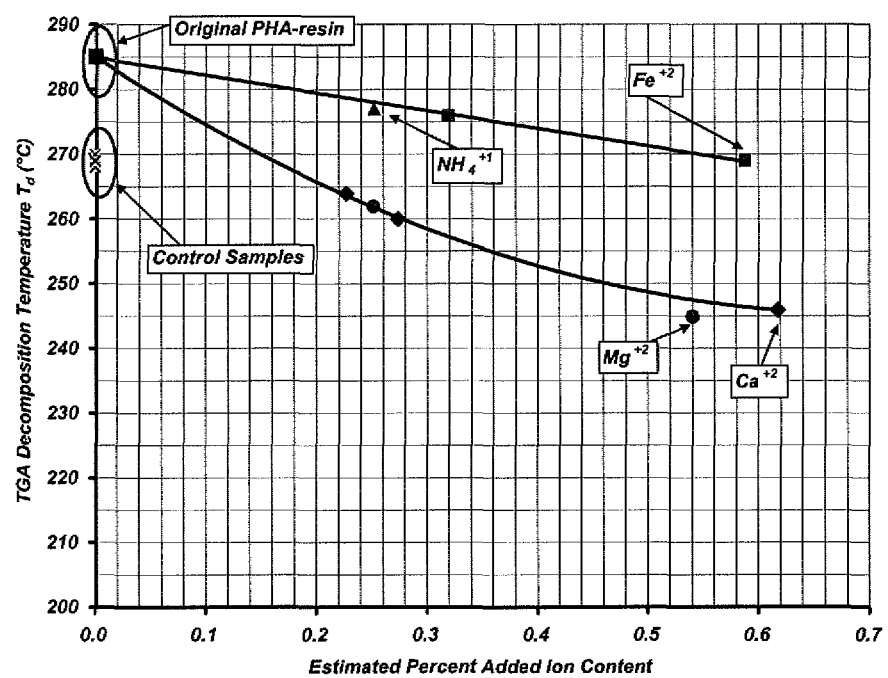
FIG. 27. Influence of introduced ions on PHA-resin thermal decomposition temperature.

In order to establish the fact that association of cations with PHA influence thermal stability, the reverse experiment (FIG. 27) was performed. PHA-resin was dissolved in chloroform at 100° C. and methanol containing 0, 40, 400 or 4000 ppm (calculated according to the amount of polymer) of either $CaCl_2$ (as $Ca^{+2}$), $MgCl_2$ (as $Mg^{+2}$), $FeSO_4$ (as $Fe^{+2}$) and $NH_4Cl$ (as $NH_4^{+1}$) was added slowly to the chloroform under continuous stirring promoting polymer precipitation. The polymer was transferred to a Petri dish and the solvent evaporated for 24 h at 70° C. The different concentrations of ion solutions were used in order to provide for higher levels of specific ions in association with the precipitated PHA-resin. An increase of respective ions that became associated with the PHA-resin was consistent in this controlled experiment with an observed increase of the TGA non-PHA content of the polymer. Calcium and magnesium promoted similar and the most significant influence on a mass basis on decrease in the thermal stability. At the same time the procedure of dissolving and re-precipitating the PHA-resin without any added ions surprisingly also exhibited a negative influence on thermal stability. However, a parallel increase of the non-PHA content for these control samples suggested a source of contamination. PHA-resin is apparently sensitive to particular ion contamination at rather low levels.

The results of thermal stability for the PHA-resin were consistent with the results of thermal stability of the PHA-in-biomass. Inorganic matter, with emphasis on cations such as calcium and magnesium due to observed dominance from elemental analysis of PHA-resin and biomass, play a role in the thermal stability of the polymer. Reducing the level of these ions in biomass or in the PHA-resin serves to increase thermal stability. Reducing the inorganic content, in terms of these ions, of PHA-rich biomass can reduce extent of molecular weight loss during biomass drying and solvent extraction. The improved thermal stability of the PHA-in-biomass is carried forward (dichloromethane, 2-butanol, and, propylene carbonate extractions) or even further enhanced (acetone extraction) into the thermal stability of the PHA-resin. Therefore, achieving a high PHA-in-biomass thermal stability is tantamount to producing a PHA-resin of equivalent or even higher thermal stability.

Even if a PHA-resin is produced with inferior thermal stability, we have discovered that the ions responsible for this effect do not appear to be strongly bound to the polymer. These ions can, to at least some extent, be rinsed away from the polymer with an aqueous wash. An acidic aqueous wash exhibits a stronger influence suggesting that the responsible ions are more soluble at lower pH. The rinsed polymer can be re-dried and will exhibit marked improvement in thermal stability. The same effects can be achieved for the PHA-in-biomass with dividends for molecular weight preservation in high temperature drying and solvent extraction as well as in reduced extraneous post process needs such as further resin washing and re-drying.

PHA-Resin Thermal Stability in Relation to Melt Stability

Additional work was conducted to gain a better understanding of how improved thermal stability could be related to a PHA-resin of superior functional quality for processing. Functional quality refers to the stability of the PHA in the melt as would be required for processing. The dynamic viscosity by rheology of many samples of commercially available pure culture derived PHA-resin as well as our mixed culture (activated sludge) derived PHA-resin was examined.

Figure 28:
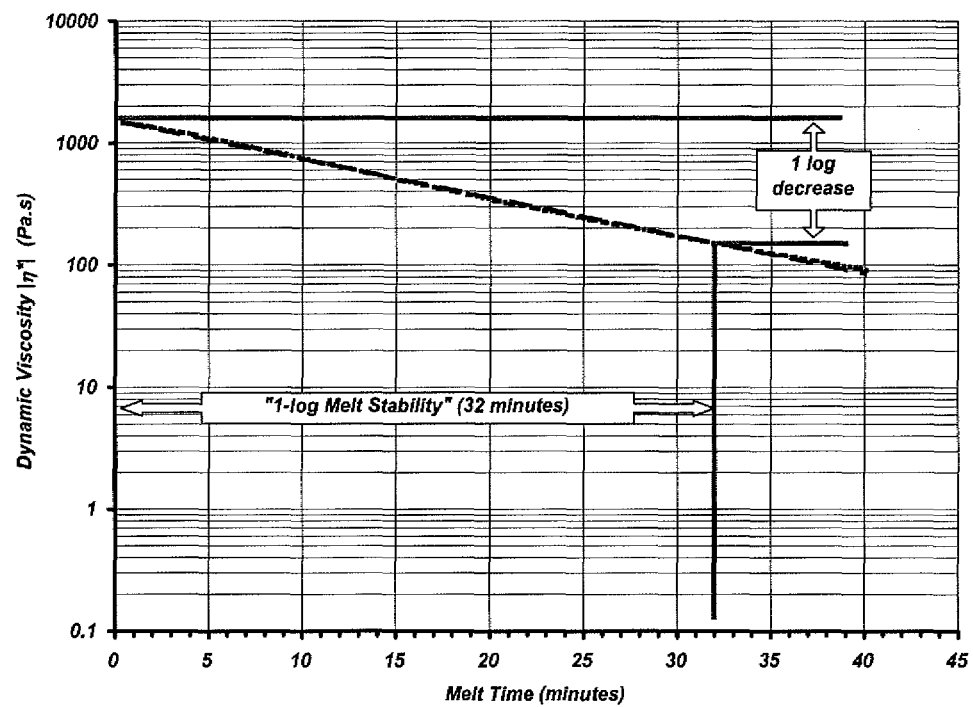
FIG. 28. AS-S derived PHA-resin melt viscosity from polymer rheology.
Figure 29:
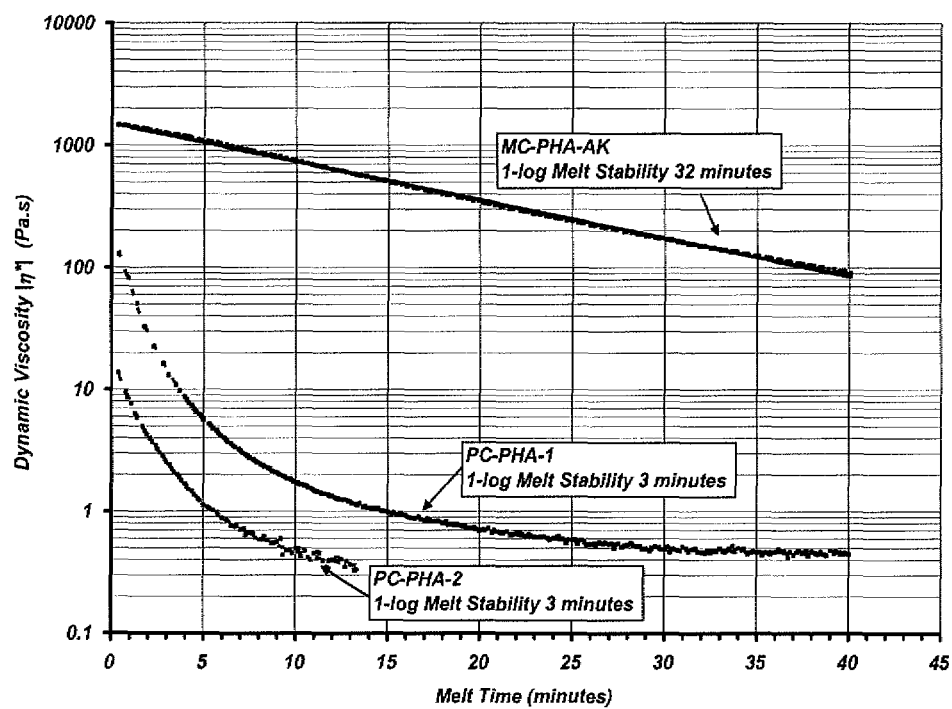
FIG. 29. 1-log melt stabilities of AS-S derived mixed culture PHA-resin and commercial grades of pure culture derived PHA-resin.

The initial dynamic viscosity of the PHA-resin in the melt can be correlated to the polymer average molecular weight. The decrease in dynamic viscosity over time in the melt, at constant temperature and strain, correlates to loss in average molecular weight. A typical result for AS-S derived PHA-resin is shown in FIG. 28. In order to reduce this trend to a single number that could be used to reflect the functional quality, or PHA-resin melt stability, the 1-log melt stability was measured in minutes. The 1-log melt stability is the time for PHA dynamic viscosity to decrease by one order of magnitude with reference to the specific methods of polymer rheology testing used here. It was immediately apparent that by preconditioning thermal stability of PHA-in-biomass followed by acetone extraction, a functionally superior PHA was being produced in comparison to at least 2 commercial PHA-resins (FIG. 29).

Figure 30:
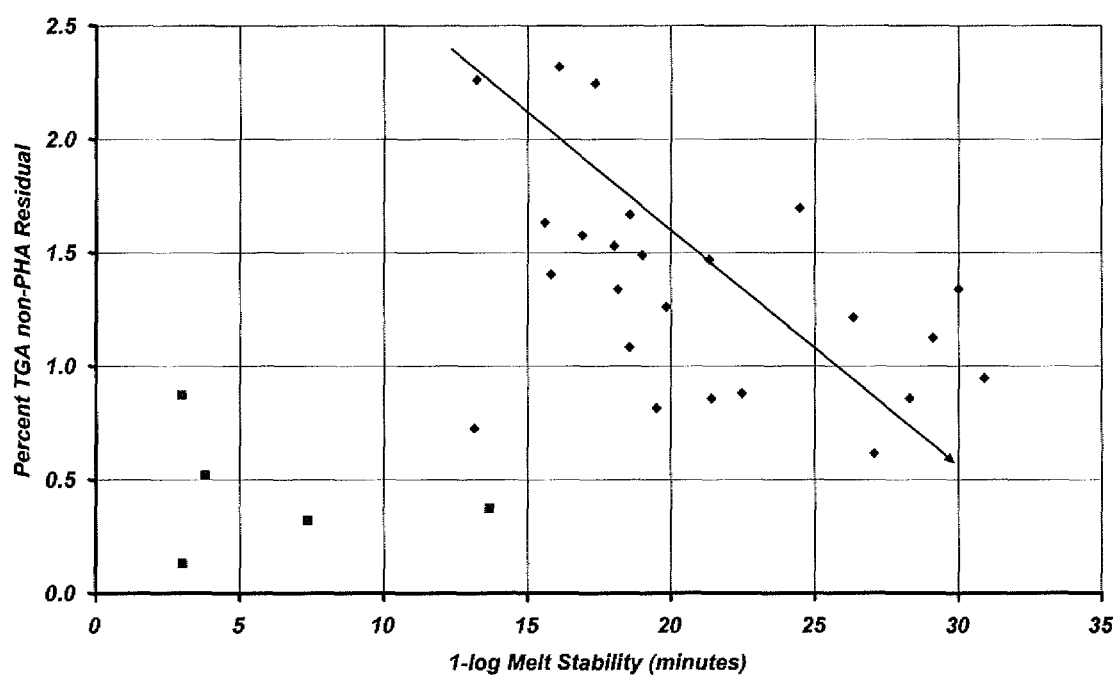
FIG. 30. Scattergram of estimated TGA purity and melt stabilities for PHA-resin samples from both pure and mixed culture sources.

The outcomes of PHA-resin melt stability for many different samples and from different biomass sources including pure and mixed cultures were assessed. As observed for PHA-resin thermal stability, the 1-log melt stability could not be related generally to the percent of non-PHA material content (FIG. 30). The TGA non-PHA content is based on the residual material fraction, with respect to the sample weight at 200° C., after the PHA weight loss peak and at TGA temperature of 350° C. While PHA-resin purity may have bearing on questions of material properties in accordance to the intended usage of the raw material, purity seemed to be a poor absolute indicator of functional quality for processing. Lower PHA-resin purity is not necessarily indicative of poorer polymer thermal stability. Plastics derived from compounding PHA-resin may contain a significantly reduced PHA component making it further less relevant if the starting PHA-resin is 96 or 99% pure. What seemed to be more relevant to the plastic compound production is the performance and stability of the PHA in the melt.

Figure 31:
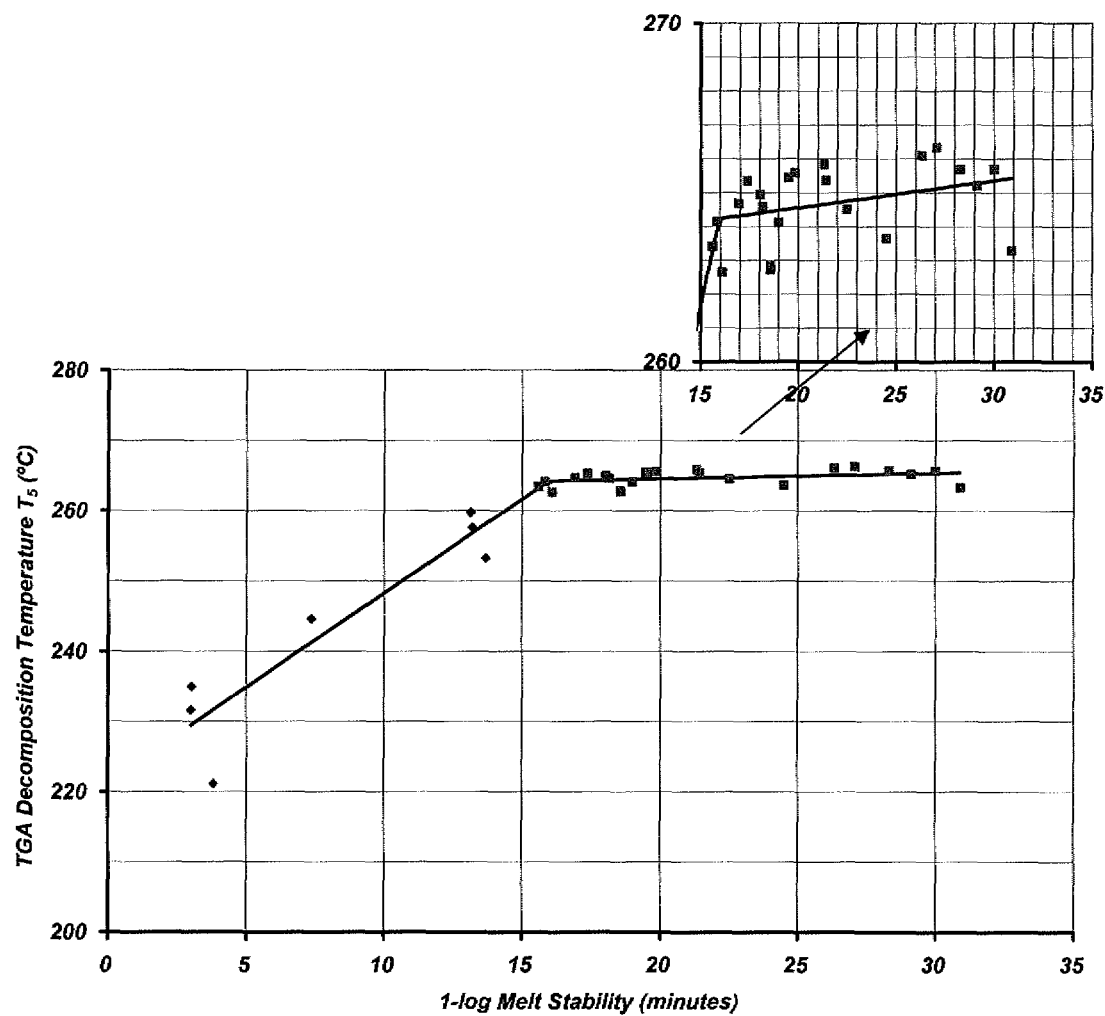
FIG. 31. Relationship between $T_5$ and the 1-log melt stability for PHA-resin samples from both pure and mixed culture sources FIG. 32. Relationship between the relative weight loss at 250° C. and the 1-log melt stability for PHA-resin samples from both pure and mixed culture sources.
Figure 32:
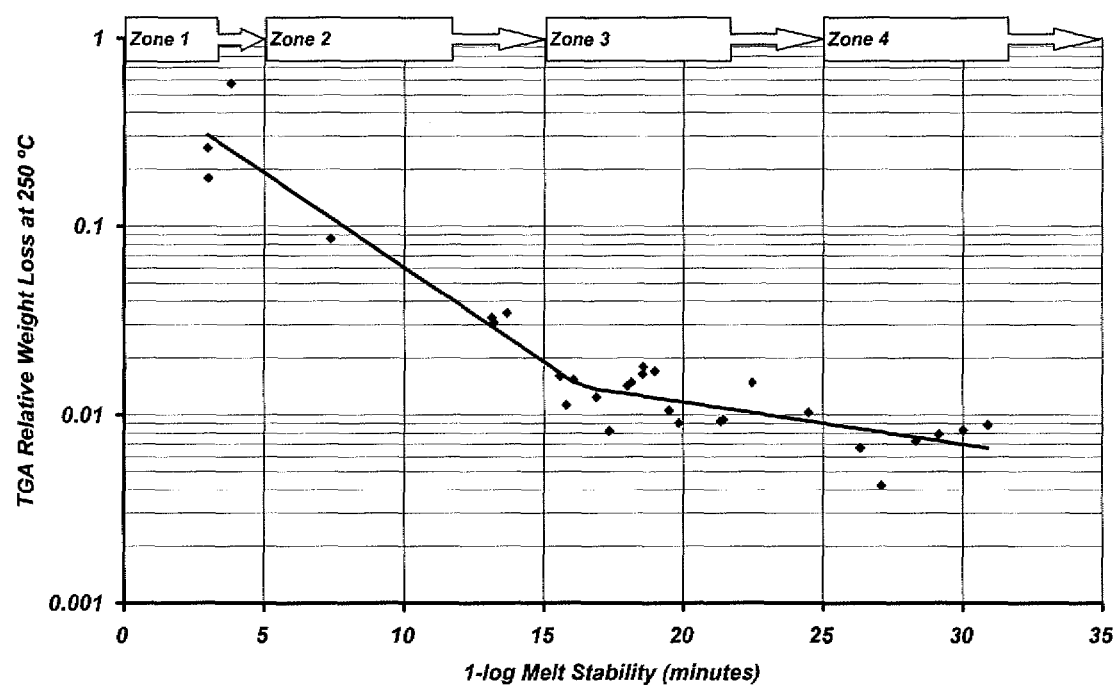

With an abundance of TGA results for the PHA-resin, and since TGA analysis data are easier to procure with less sample material than dynamic viscosity measurements, an empirical association between results of thermal stability and the 1-log melt stability (FIG. 31 and FIG. 32) was established. These results suggested that when the $T_5$ is greater than 260° C. (and preferably greater than 262° C.), the 1-log melt stability will most likely exceed 15 minutes. The $f_d^{250}$ further suggested 4 zones of PHA-resin quality from the TGA data in relation to 1-log melt stabilities:

Zone 1: $0.1 < f_d^{250} < 1.0$     $0 <$ 1-log melt stability $< 5$ minutes
Zone 2: $0.012 < f_d^{250} < 0.1$     $5 <$ 1-log melt stability $< 15$ minutes
Zone 3: $0.01 < f_d^{250} < 0.012$     $15 <$ 1-log melt stability $< 25$ minutes
Zone 4: $0.001 < f_d^{250} < 0.01$     $25 <$ 1-log melt stability $< 35$ minutes The observed variability in the data makes it difficult to discriminate between zone 3 and 4 with confidence. Further refinement to the presented quality zones may be possible with more sophisticated analysis of the TGA data. It may also be that the variability of the experimental data about the trend line in FIG. 32 is due to potential for signal to noise limitation for the TGA measurement itself with the equipment used for this study. Notwithstanding, these results of the functional quality of the PHA-resin indicated that a superior product is to be expected when $T_5$ is greater than 260° C. and $f_d^{250}$ is equal to or less than 0.011. Preconditioning PHA-in-biomass for higher PHA-in-biomass thermal stability is an effective route to reliably achieve at the very least a zone 3 PHA-resin.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering polyhydroxyalkanoates (PHA) from biomass contained in mixed liquor and increasing the thermal stability of PHA in the biomass prior to subjecting the PHA and biomass to elevated temperatures in a PHA recovery process, the method comprising;
  a) increasing the thermal stability of the PHA in the biomass, without substantially degrading the biomass, in order to reduce the thermal decomposition of the PHA in the recovery process by:
    (1) acidifying the mixed liquor containing the biomass to a value below pH 6; and
    (2) concentrating the biomass in the mixed liquor by dewatering the mixed liquor to form a concentrated mixed liquor;
  b) recovering the PHA from the biomass by dissolving the PHA in an organic solvent at a temperature above 100° C.;
  wherein said organic solvent is a non-chlorinated organic solvent.

2. The method of claim 1, further comprising after concentrating the biomass in the mixed liquor, drying the concentrated mixed liquor to produce dried biomass containing the PHA.

3. The method of claim 2, wherein drying occurs at temperatures above 100° C.

4. The method of claim 1, further including, during acidification of the mixed liquor, solubilizing inorganic cations associated with the biomass into the mixed liquor.

5. The method of claim 1, wherein reducing the thermal decomposition of the PHA includes increasing the $T_d$ of the PHA in biomass to greater than 260° C.

6. The method of claim 1, wherein acidifying the mixed liquor occurs at room temperature.

7. The method of claim 1, including recovering the PHA from the biomass by dissolving the PHA in an organic solvent at a temperature above 120° C.

8. The method of claim 1, including acidifying the mixed liquor containing the biomass and lowering the pH of the mixed liquor to 2-5.

9. A method of recovering polyhydroxyalkanoates (PHA) from biomass contained in mixed liquor and increasing the thermal stability of PHA in the biomass prior to subjecting the PHA and biomass to elevated temperatures in a PHA recovery process, the method comprising:
   a) increasing the thermal stability of the PHA in the biomass, without substantially degrading the biomass, in order to reduce the thermal decomposition of the PHA in the recovery process by:
      (1) adjusting or maintaining the pH of the mixed liquor containing the biomass such that the pH is between 2 and 5, wherein inorganic cations associated with the biomass are solubilized into the mixed liquor;
      (2) concentrating the biomass in the mixed liquor by dewatering the mixed liquor to form a concentrated mixed liquor, wherein dewatering the mixed liquor removes at least some of the solubilized inorganic cations;
   b) recovering the PHA from the biomass by dissolving the PHA in an organic solvent at a temperature above 120° C.;
   wherein said organic solvent is a non-chlorinated organic solvent.

10. The method of claim 9, further comprising drying the concentrated mixed liquor.

11. The method of claim 10, wherein drying occurs at temperatures above 100° C.

12. The method of claim 9, wherein reducing the thermal decomposition of the PHA includes increasing the $T_d$ of the PHA in biomass to greater than 260° C.

13. The method of claim 9, wherein acidifying the mixed liquor occurs at room temperature.

14. The method of claim 9, wherein acidifying the mixed liquor occurs for approximately one (1) hour.

* * * * *